United States Patent [19]

Lawton

[11] Patent Number: 5,014,207
[45] Date of Patent: May 7, 1991

[54] SOLID IMAGING SYSTEM

[75] Inventor: John A. Lawton, Landenberg, Pa.

[73] Assignee: E. I. Du Pont de Nemours and Company, Wilmington, Del.

[21] Appl. No.: 341,517

[22] Filed: Apr. 21, 1989

[51] Int. Cl.$^5$ .................. G06F 15/62; B23K 26/02
[52] U.S. Cl. .................. 364/468; 364/473; 219/121.73; 219/121.8
[58] Field of Search .................. 364/468, 473, 474.08, 364/474.24; 425/174, 174.4; 264/22, 308, 25; 219/121.25, 121.28, 121.29, 121.8, 121.73, 121.82; 156/60

[56] References Cited

U.S. PATENT DOCUMENTS

| 2,775,758 | 12/1956 | Munz | 343/17 |
| 3,743,777 | 7/1973 | Hanus et al. | 219/121 LM |
| 4,393,450 | 7/1983 | Jerard | 364/474.24 |
| 4,504,726 | 3/1985 | Hosaka et al. | 219/121.8 |
| 4,575,330 | 3/1986 | Hull | 425/174.4 |
| 4,665,492 | 5/1987 | Masters | 364/468 |
| 4,675,825 | 6/1987 | DeMenthon | 364/474.22 |
| 4,752,498 | 6/1988 | Fudim | 427/54.1 |
| 4,797,532 | 1/1989 | Maiorov | 219/121.74 |
| 4,915,757 | 4/1990 | Rando | 156/64 |
| 4,929,402 | 5/1990 | Hull | 264/22 |

FOREIGN PATENT DOCUMENTS

| 0250121 | 12/1987 | European Pat. Off. |
| 8910255 | 11/1989 | European Pat. Off. | 425/174.4 |
| 56-144478 | 11/1981 | Japan. |
| 61-114817 | 6/1986 | Japan. |
| 61-114818 | 6/1986 | Japan. |
| 61-116320 | 6/1986 | Japan. |
| 61-116321 | 6/1986 | Japan. |
| 61-116322 | 6/1986 | Japan. |
| 63-145016 | 6/1988 | Japan. |

OTHER PUBLICATIONS

H. Kodama, "Automatic Method for Fabricating a Three-Dimensional Plastic Model with Photo-Hardening Polymer", Rev. Sci. Instrum. 52(11), Nov. 1981, pp. 1770–1773.

Alan J. Herbert, "Solid Object Generation", Journal of Applied Photographic Engg., vol. 8, No. 4, Aug. 1982, pp. 185–188.

A. J. Herbert, "A Review of 3D Solid Object Generation", Journal of Imaging Technology, vol. 15, No. 4, Aug. 1989, pp. 186–190.

Primary Examiner—Jerry Smith
Assistant Examiner—Paul Gordon
Attorney, Agent, or Firm—J. H. Dautremont

[57] ABSTRACT

In a solid imaging system, the beam of a relatively high-powered beam radiation source, and more particularly a laser, is modulated in accordance with its varying vector sweep speed so that substantially constant layer depth is maintained at all scanner speeds in a strip of photohardenable composition as it hardens and solidifies in response to the source's irradiation.

28 Claims, 11 Drawing Sheets

SOLID IMAGING SYSTEM

FIELD OF THE INVENTION

This invention relates to production of three-dimensional objects by photohardening, and more particularly to the controlled use of relatively high power beam radiation sources such as high-power lasers to accomplish said production directly at a relatively high rate and accuracy.

BACKGROUND OF THE INVENTION

Many systems for production of three-dimensional modeling by photohardening have been proposed. European patent application (Publication No. 250,121 filed by Scitex Corporation, Ltd. on June 6, 1987), and incorporated herein by reference, provides a good summary of documents pertinent to this art area, including various approaches attributed to Hull, Kodama, and Herbert. Additional background is described in U.S. Pat. No. 4,752,498 issued to Fudim on June 21, 1988, which is also incorporated herein by reference.

These approaches relate to the formation of solid sectors of three-dimensional objects in steps by sequential irradiation of areas or volumes sought to be solidified. Various masking techniques are described as well as the use of direct laser writing, i.e., exposing a photohardenable composition with a laser beam according to a desired pattern and building a three-dimensional model layer by layer.

However, all these approaches omit to identify practical ways of utilizing the advantages of vector scanning combined with means to maintain constant exposure and attain substantially constant final thickness of all hardened portions on each layer throughout the body of the rigid three dimensional object.

Furthermore, they omit to recognize very important interrelations within specific ranges of operation, which govern the process and the apparatus parameters in order to render them practical and useful. Such ranges are those of constant exposure levels dependent on the photohardening response of the material, those of minimum distance traveled by the beam at maximum acceleration dependent on the resolution and depth of photohardening, as well as those of maximum beam intensity dependent on the photospeed of the photohardenable composition.

The Scitex patent, for example, suggests the use of photomasks or raster scanning for achieving uniform exposure, but does not suggest a solution for keeping the exposure constant in the case of vector scanning. The use of photomasks renders such techniques excessively time consuming and expensive. Raster scanning is also undesirable compared to vector scanning for a number of reasons, including:

necessity to scan the whole field even if the object to be produced is only a very small part of the total volume, considerably increased amount of data to be stored in most cases, overall more difficult manipulation of the stored data, and the necessity to convert CAD-based vector data to raster data.

On the other hand, in the case of vector scanning only the areas corresponding to the shape of the rigid object have to be scanned, the amount of data to be stored is smaller, the data can be manipulated more easily, and "more than 90% of the CAD based machines generate and utilize vector data" (Lasers & Optronics, Jan. 1989, Vol. 8, No. 1, pg. 56). The main reason why laser vector scanning has not been utilized extensively so far is the fact that, despite its advantages, it introduces problems related to the inertia of the optical members, such as mirrors, of the available deflection systems for the currently most convenient radiation sources, such as lasers. Since these systems are electromechanical in nature, there is a finite acceleration involved in reaching any beam velocity. This unavoidable non-uniformity in velocity results in unacceptable thickness variations in the exposed photohardenable composition. Especially in the case of portions of layers having no immediate previous levels of exposure at the high intensity it becomes necessary to use high beam velocities, and therefore, longer acceleration times, which in turn result in thickness non-uniformity in the exposed composition. The use of low intensity lasers does not provide a good solution since it makes production of a solid object excessively time consuming. In addition, the usefulness of vector scanning is further minimized unless at least the aforementioned depth and exposure level relationships of the photohardenable composition are observed as evidenced under the Detailed Description of this invention.

It is therefore an object of the present invention to provide a method and apparatus for direct laser writing in a vector mode onto an unexposed photohardenable composition by scanning and forming sequential three-dimensional model layers of precisely-controlled depth and resolution.

SUMMARY OF THE INVENTION

The instant invention is directed to a method and apparatus for direct production of three-dimensional photohardened models layer by layer using high intensity lasers for direct laser writing in a vector mode, wherein the depth of the resulting exposure traces in the photohardenable composition is precisely controlled, and it can be summarized as follows:

A process for accurately fabricating an integral three-dimensional rigid object from successive thin layers of a liquid photohardenable composition comprising the steps of:

placing the liquid photohardenable composition in a vessel, generating a radiation beam having an intensity by using radiation means, controllably modulating the intensity of the radiation beam from substantially zero intensity level to a maximum intensity by using modulation means, controllably deflecting the radiation beam in a vector scanning mode to predetermined positions on the successive thin layers in order to induce photohardening of preselected portions of the liquid photohardenable composition to a depth of photohardening, and also deflecting the radiation beam with an acceleration from zero level to a maximum acceleration, and with a velocity from zero level to a maximum velocity by using deflection means, storing graphic data corresponding to the shape of the rigid object, coupling a second computer control means with the modulation means, the deflection means, and the first computer control means for providing a substantially constant exposure level on the predetermined portions of the liquid photohardenable composition in order to achieve substantially constant depth of photohardening within each successive thin layer, supporting the rigid object on a movable substantially flat table within the vessel, controllably moving the flat table by using placement means, the placement means being controlled by the first computer control means, and forming the successive thin layers of the liquid photohardenable composition by layer forming means, the layer forming means being controlled also by the first computer control means.

DESCRIPTION OF THE DRAWINGS

The reader's understanding of practical implementation of preferred embodiments of the invention will be enhanced by reference to the following detailed description taken in conjunction with perusal of the drawing figures, wherein.

DETAILED DESCRIPTION OF THE INVENTION

This invention relates to a process and apparatus of producing three-dimensional objects by photohardening, and more particularly to the controlled use of relatively high-powered lasers to accomplish said production directly at a relatively high rate and accuracy.

Figure 1:
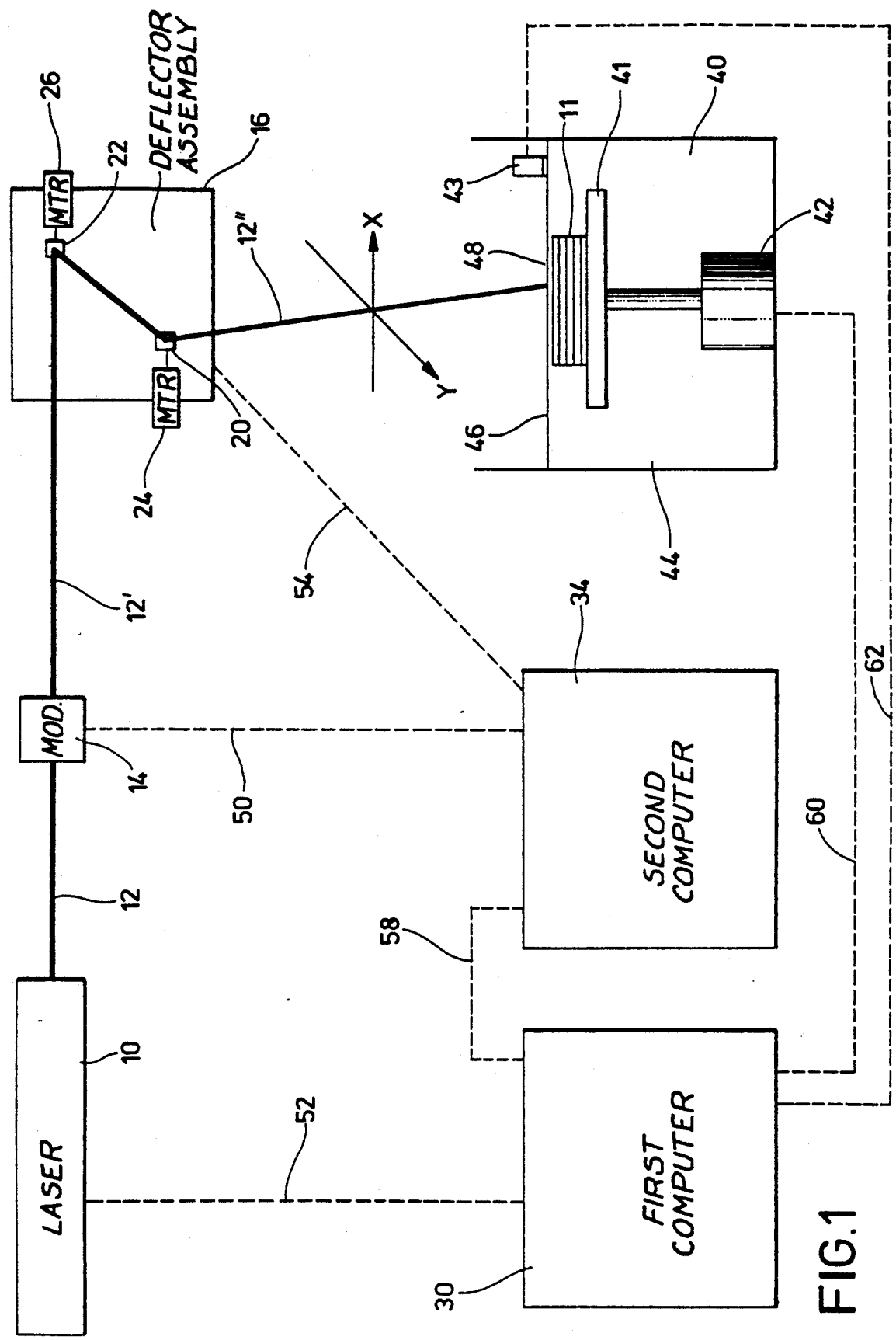
FIG. 1 is a block diagram of the preferred embodiment of the apparatus of the instant invention.

In reference now to FIG. 1, there is provided radiation means 10, such as a laser, producing a radiation beam 12. Being an object of the present invention to produce solid objects 11 at high speed, the apparatus of the instant invention preferably utilizes relatively high power radiation means 10, such as high power lasers, which may have major bands in the visible, infrared, or ultraviolet regions. High power is considered to be a power greater than 20 mW, and preferably over 100 mW as measured from the intensity of radiation beam 12. This is so with the present photospeeds of photohardenable compositions. However, as faster compositions become available, the values of 20 mW and 100 mW for the beam intensity will become lower accordingly, since photospeed of the composition and intensity of the radiation beam have an inverse relation to each other in order to achieve the same results. The selection of a certain type of laser should be coordinated with the selection of photohardenable composition in a way that the sensitivity of the photohardenable composition agrees reasonably well with the wavelength of the laser's emission. Other types of radiation means may also be utilized such as electron beams, x-rays, and the like, as long as their energy type is matched with the sensitivity of the photohardenable composition, a beam is provided, and the appropriate conditions for their handling are observed according to established ways, well known in the art. Although means may be provided to modify the shape of the beam cross-section to any desirable shape, the ordinary shape is circular, and the profile of the intensity of the beam is gaussian with a maximum at the center of the circular shape.

The radiation beam 12 passes through modulator 14, the modulator being preferably an acousto-optical modulator. The modulated radiation beam 12' passes in turn through deflection means 16, which comprises two mirrors 20 and 22, each mirror having an axis (not shown), allowing reflection of the beam to surface 46 in X and Y directions, the X and Y directions being perpendicular to each other and parallel to surface 46. The mirrors 20 and 22 may rotatably move around their corresponding axes by means of motors 24 and 26, respectively for controllably deflecting the beam in a vector scanning mode, in the X and Y directions, towards predetermined positions of a liquid photohardenable composition 40, contained in vessel 44. Examples of suitable photohardenable compositions are given at a later section of this description. As the beam is deflected by the deflection means 16, it assumes an acceleration from zero level to a maximum acceleration and a velocity from zero level to a maximum constant velocity. The velocity and the intensity of the beam remain proportional to each other, so that the exposure remains substantially constant. The beam causes photohardening of preselected portions of the composition to a substantially constant depth of photohardening. Depth of photohardening is defined as the maximum or peak thickness between surface 46 and the opposite side of the photohardened thin layer, when measured on a cross section normal to the direction of scanning. As it will be seen later in this description, the thickness of each individual photohardened layer or part thereof may vary from point to point on a scan line. Thus, to avoid confusion, the thickness of photohardening refers to the thickness at any point of said layer, while depth of photohardening is restricted to the above definition. Within vessel 44, there is provided a movable table 41 and placement means such as an elevator motor 42 for providing a motion to the movable table 41 in order to accurately control placement of the movable table within the vessel 44. The motion of table 41 may be translational, rotational, random, or a combination thereof. Layer forming means, such as a doctor knife 43 is located over the table 41 within the vessel 44, for forming successive thin layers of liquid photohardenable composition. There is also provided first computer control means 30 and second computer control means 34. The first computer control means 30 is coupled with the radiation means 10, the placement means 42, the layer forming means 43 and the second computer control means 34 through control/feedback lines 52, 60, 62, and 58, respectively. The second computer control means 34, in addition of being coupled with the first computer control means 30, through line 58, it is also coupled with modulator 14, and deflection means 16 through control/feedback lines 50, and 54, respectively. Ancillary and obvious devices are not shown for the purpose of simplicity.

As mentioned above, the modulation of the radiation beam in a way to attain constant exposure can be either analog or digital. A commercially available system, manufactured by Greyhawk ® (Greyhawk Systems, Inc., 1557 Center Point Drive, Milpitas, CA 95035), modified as explained below, may be used as part of the second computer control means 34 in the present invention for controlling the exposure level to a constant value. The Greyhawk ® system converts pulse signals generated from encoders (not shown), attached to the shafts of motors 24 and 26, which encoders indicate rotation of the shaft and therefore proportional movement of the laser beam, reflected from the mirrors, in the imaging surface 46, to an electrical pulse signal which is processed digitally, taking into account presence of image space and amount of desired exposure, which directly modulates the laser. Effectively, the laser is modulated digitally corresponding to a discrete distance that the beam has moved in the image plane. Since the modulation of the laser calls for the laser to be on for a specific time frame per pulse, the result is a substantially more uniform exposure per distance moved by the laser beam in the image plane.

Direct digital modulation of a laser which is not solid state is currently impractical since typically such lasers cannot be modulated digitally at high enough rates to be useful for Solid Imaging. These lasers may be operated only continuously (CW), since if pulsed, the pulse repetition rate and/or the pulse time width cannot follow the modulation signals generated by the Greyhawk ® system electronics. This creates non-uniform exposure in the image plane. To modulate the beam of a non-solid state laser at the high rates required by systems such as the Greyhawk ® one, the electrical signals adequate to operate a solid-state laser must be drastically modified to actuate a light switch in the beam path of a CW laser. The light switch and modifying electronics employed must be capable of following the electrical modulation signals and must have adequate transmissive efficiency in the "on state" to provide useful beam energy where required in the image surface 46. Such light switches may be analog or digital. The most preferred type of switch is acousto-optical. Examples of other switches that may be used are:

Electro-optic, which are based on a crystal that changes optical polarity when voltages are applied;

liquid crystal gates, such the one that can be used in the visible region, made by Meadowlark Optics (7460 East County Line Road, Longmont, Colorado 80501) called a Beam Gate. It too is based on a change in polarization of the liquid crystal material;

Piezoelectric cells, which may move diaphragms, such as a small pinhole;

The so called PLZT (Pb 0.9, La 0.1, Zr 0.65, Ti 0.35) based switches, which rely on polarization. Two polarizing plates are placed with their axes 90 degrees to one another, and with a PLZT ferroelectric crystal inserted thereinbetween. The PLZT crystal is capable of rotating the polarity of light passing through depending on whether there is an electrical field applied to the PLZT or not. So now in the off position (PLZT has no electric field), light passing through the first polarizer is unchanged through the PLZT and is blocked by the second polarizer. But when the PLZT is under the electric field, light passing through the first polarizer is rotated by the PLZT and is capable of passing through the second polarizer.

Figure 2:
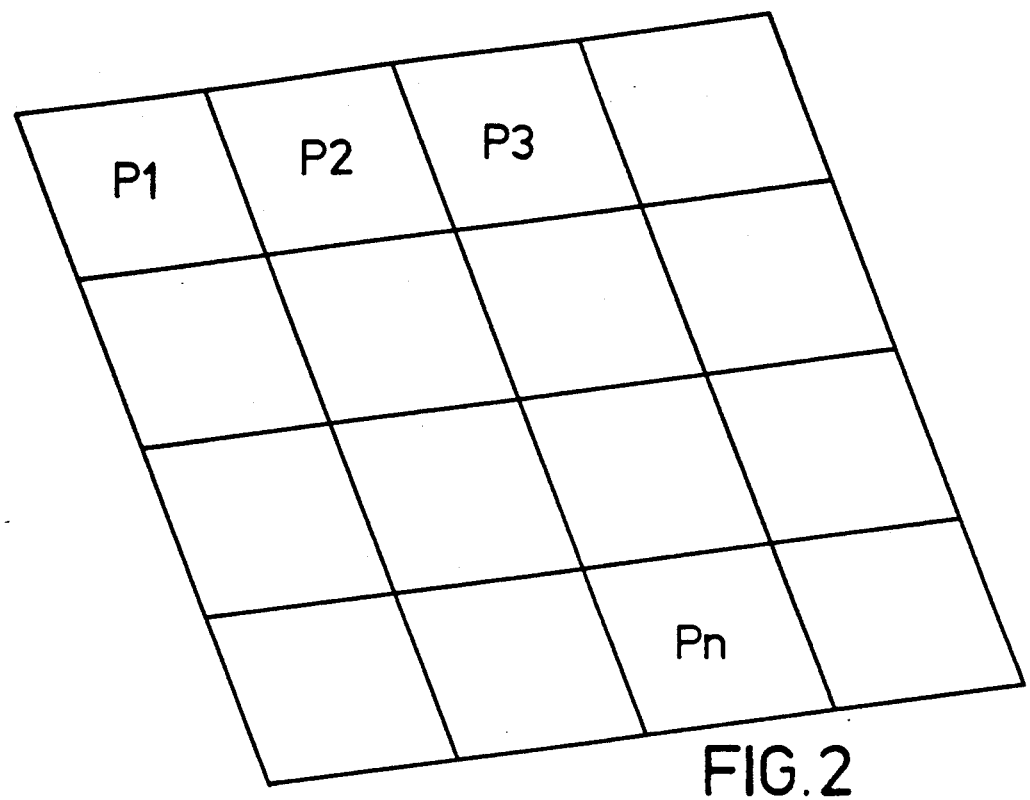
FIGS. 2 and 3 illustrate the division of surfaces and volumes to pixels and voxels, respectively.
Figure 3:
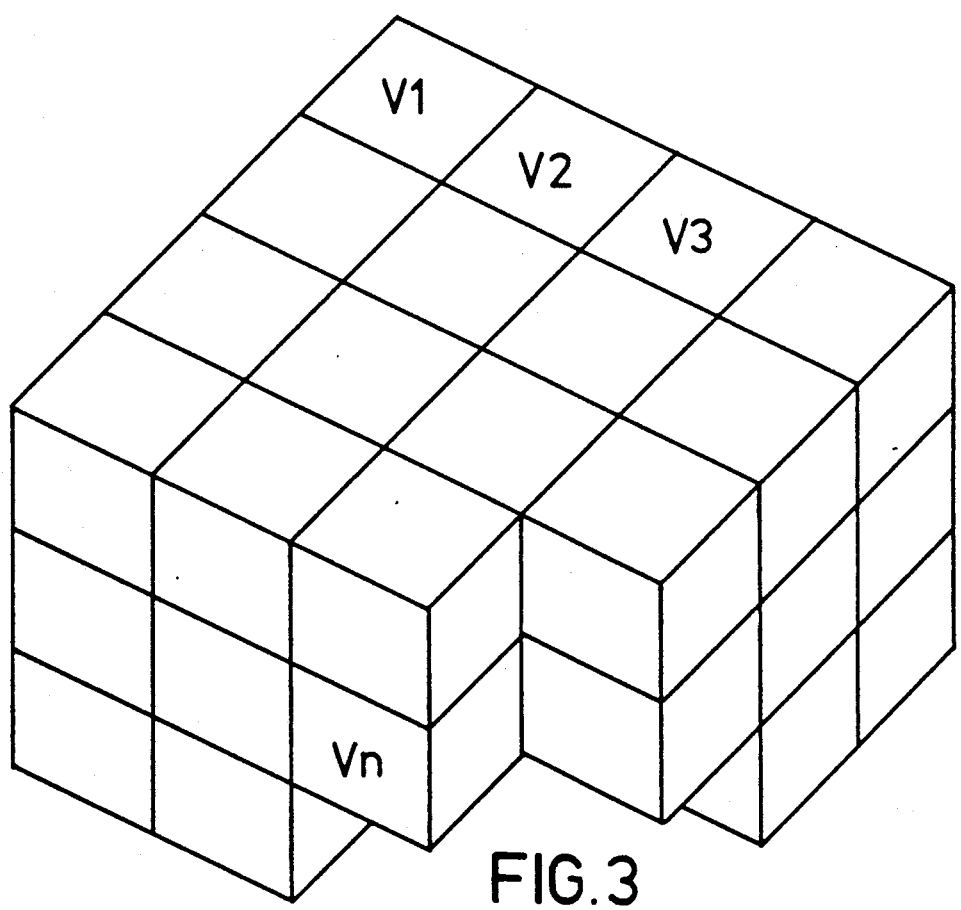

It is well known in the art that for practical purposes, better understanding and better description, it is desirable to divide an image lying on a two-dimensional surface into small imaginary area units called pixels, such as P1, P2, P3,...Pn, as shown in FIG. 2. The pixels are usually square in shape, thus having the same dimensions in both X and Y directions. The main reason for selecting the square shape instead of a rectangular or other shape is that in the plurality of cases the same resolution is both encountered and desired in both directions. In a similar way, when a solid is being under consideration, the volume of the solid may be divided into small imaginary cubes called voxels such as V1, V2, V3,...Vn, as illustrated in FIG. 3. For the same reasons as described above, the cube is the preferred shape of a voxel, thus the voxel might have the same dimensions in all three directions X, Y, and Z.

It is preferable for the product of this apparatus and process to be described by cubic voxels having edge dimensions equal to the scan line spacing, that is the spacing of the centers of any two consecutive scan lines of the beam 12" on the surface 46 of the photohardenable composition 40, which lines are substantially parallel to each other.

One would expect that by using simple extrapolations of the teachings of two dimensional imaging, one would be able to predict the behavioral characteristics of solid or three dimensional imaging, such as optimum spacing of scan lines, for example. This, however is far from true, and matters are much more complicated, especially since a new complex variable such as the depth and thickness of photohardening in general, which have small and constant values in two dimensional imaging, are present and actively involved in solid imaging. In a single scan (mono-scan) of a focused laser beam along a line on the surface of a photohardenable composition, one would expect at first thought to receive a linear solid having a rectangular cross section. Expert thought might lead to the expectation that such cross section would be gaussian in shape as resulting from a radiation beam having gaussian cross sectional distribution. However, neither prediction is true. The applicant has discovered that the cross section of the linear solid thus formed is unexpectedly substantially non-gaussian in shape. In other words, if a linear solid formed in this manner is cut normal to its length, the width starting at the liquid surface decreases almost linearly with the distance from the surface 46 till near the tip of the solid formed. This cross-sectional characteristic is important information for scanned solid imaging, since normally when layers are scanned to fill in part regions of each cross-sectional laminae, the scan consists of lines or vectors spaced substantially parallel each other in such a manner as to produce a complete solid plane. Knowledge that the width of each vector decreases substantially linearly with the distance from surface 46 allows one to determine the proper spacing between the vector lines in order to provide uniform exposure and uniform depth of photohardening. With proper line spacing, ripple, which is the thickness variation at the bottom of each thin layer is minimized, the tendency for layer curl is reduced, part resolution and tolerances can be held, the layers will have greater strength with smaller directional strength differences, adhesion is improved layer to layer, and the number of scan lines can be minimized. The applicant proposes that the cross section of the mono-scanned solid line is substantially non-gaussian because the edges of the gaussian-shaped energy profile of the radiation beam while scanning becomes ineffective regarding their ability to photoharden the corresponding portions of the photohardenable composition for a plurality of reasons, such as:

Low exposures fall within a region, where no photohardening may occur; the induction region, well known in the art.

Figure 4:
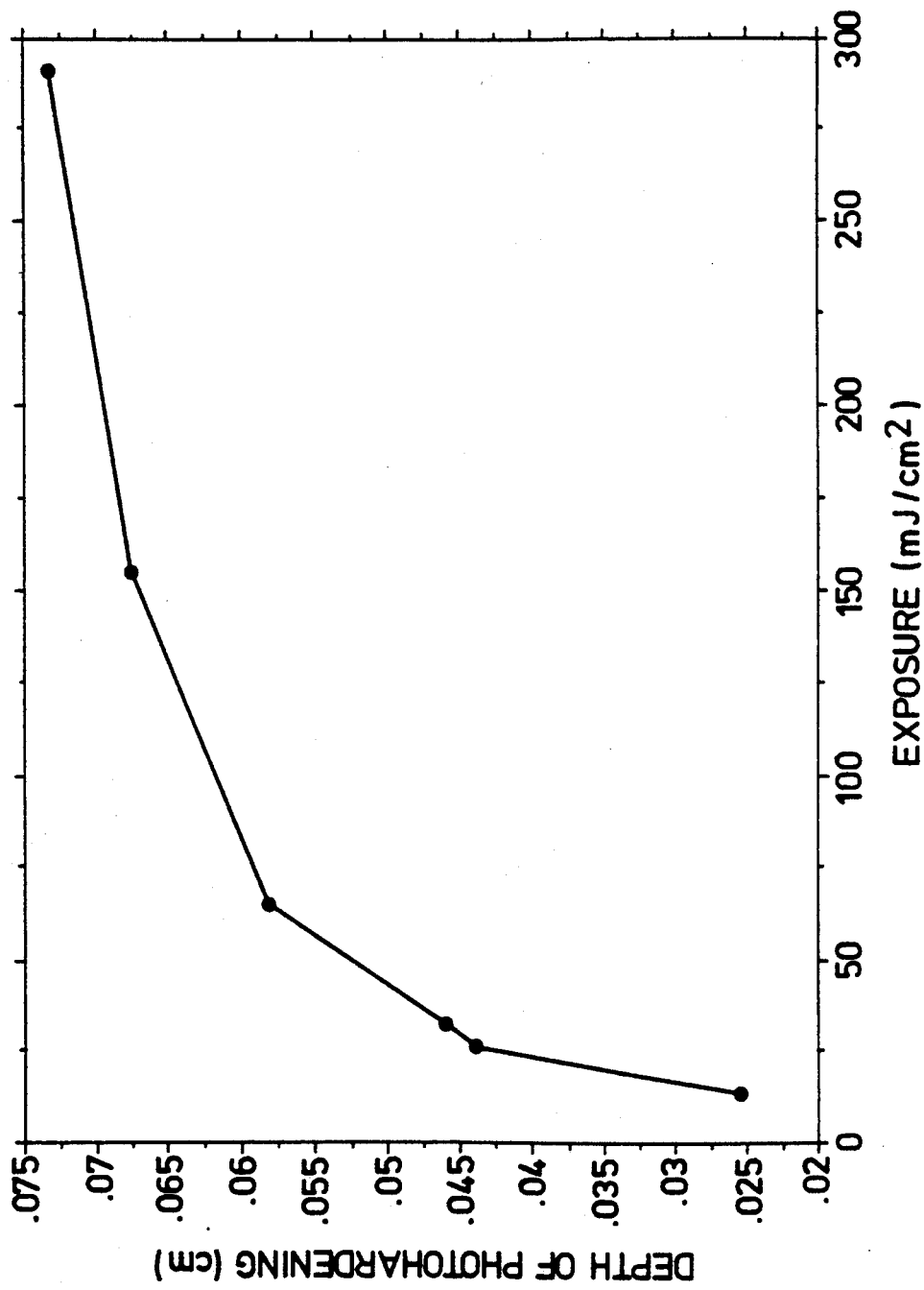
FIG. 4 shows the relation between the depth of a photohardened layer of the photohardenable composition of Example 1 as a function of exposure to the beam radiation.

During mono-scanning (single scanning) of a circular gaussian beam, the portions towards the locus of the center of the moving spot, the spot being the intersection of the beam with the surface of the photohardenable composition, will necessarily receive higher exposure than the portions further away from this locus, in a gaussian mode that varies inversely to the velocity of the spot. The same will be correspondingly true with every layer affected by the beam. The combination of the gaussian function with the S-shaped thickness of photohardening to exposure relationship, which in Solid Imaging may be defined as the Depth & Exposure curve, an example of which is illustrated in FIG. 4 regarding the behavior of one of our preferred compositions described in Example 1, explains the non-gaussian shape of a mono-scanned line.

It is very important to make note of the fact that the depth of photohardening and thickness of photohardening are not only functions of the nature of the photohardenable composition, the beam intensity and the time of direct beam incidence, but also depend on other parameters and secondary effects, such as scan overlapping, secondary exposure resulting from exposing neighboring portions, etc. For example, the depth of photohardening of one single scan line is considerably smaller than the depth of photohardening of a plurality of closely overlapping scan lines producing a continuous film. Similarly, the higher the number of lines scanned and the closer they are placed to each other the larger the depth of photohardening, if everything else is kept constant. Also, since edges have neighboring exposure scans on one side only, they are apt to receive lower total exposure, and therefore result in smaller depth of photohardening than middle portions during photohardening, unless corrective steps are taken.

Due to the above phenomena, a second significant difference, discussed in more detail later, between conventional two dimensional imaging and solid imaging manifests itself. In order to form scanning images in conventional two dimensional imaging systems, it is known in the art that the optimum scan line spacing between lines to eliminate a visual sense of ripple in the image occurs when the distance between the lines is approximately equal to or less than the $1/e^2$ diameter of the imaging beam which has a gaussian intensity profile. For solid imaging, placement of scan lines at this spacing would produce a noticeable ripple on the under surface of each layer in the case of the composition described in Example 1. The reason for this is that the non-gaussian shapes of the material's response to exposure would not overlap enough to give acceptable uniform thickness of the photohardened thin layer.

Thus, determination of the scan spacing is very important since it directly leads to definition of the dimensions for a voxel, and therefore the resolution capability of the Solid Imaging System to meet the tolerance requirements of the rigid object to be produced.

The relationship between the detailed thickness of photohardening at every point of the cross section of a single scan line, and exposure to the corresponding gaussian shaped intensity profile of the beam line was found to follow the equation Photohardened Thickness = [1]

$$G\{E\} = G\{P \exp[-2((Y/ro)^2)]/(\sqrt{2\pi} \, v \, ro)\}$$

Where G(E) represents a function with good fit to the materials depth upon exposure E (mJ/cm$^2$) response (a second order natural log polynomial was used for the composition of example 1, $G\{E\}(mm) = -.66 + .446 \ln[E] - .0356 (\ln[E])^2$); P is the beam radiant flux (mW) at the image plane; Y is the variable distance away from the scan center; ro is the $1/^2$ beam radius of the gaussian beam; and v is the velocity of the beam scan across the surface. It is surprising that even though the units of exposure in the equation relating G{E} with the second order natural log polynomial are not dimensionless, the fit is excellent.

Figure 5:
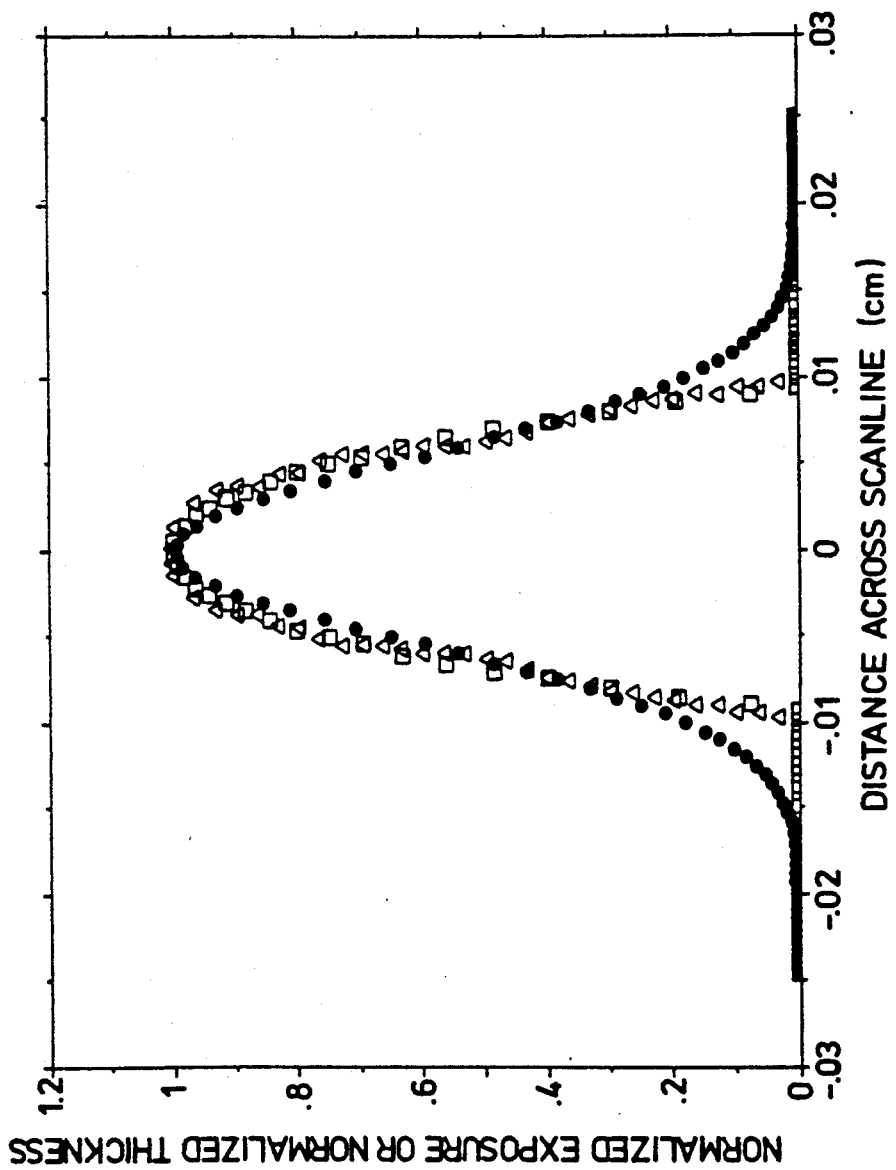
FIG. 5 depicts a comparison of normalized curves of the exposure profile versus calculated and actual thickness across a scan line.

FIG. 5 shows the normalized gaussian exposure about the center of the beam spot cut perpendicular to a constant velocity single scan line, when the beam is continuously on, and the normalized actual thickness of photohardened material (with a composition of example 1) scanned with a constant velocity single vector and cut perpendicular to the scan direction, and the normalized predicted thickness of photohardening scanned under the same conditions.

The curves were normalized to a common maximum relative value of 1, to better depict the differences of the profiles.

Note that the profile of the mathematical prediction of thickness of photohardening about the center of a single scan exposure substantially matches the profile of the actual material's measured thickness, and it is considerably different from what one might predict just based on the shape of the exposure profile.

The determination of the composition's response to exposure is essential for Solid Imaging since it leads to the definition of the total system's ability to produce objects to desired tolerances based on the system's resolution and the composition's response. It is the ability of the optical system to control the laser energy to a given time/power resolution that leads to the ability to maintain line, layer, and subsequently part tolerances. An optical scanning system may have excellent resolution in that it directs and focuses the laser energy to the desired size and location. However, it will be the material's response to the absorbed energy that dictates the tolerance of a line, layer, and part that is produced.

Knowledge of the profile of a single line may lead one to assume that a layer formed by parallel lines, overlapping in a manner adequate to produce adhesion between the lines and to fill in the regions between the tips of the lines, can be modeled by the simple addition of the thickness response of a series of single lines scanned with a continuously on beam. Such a mathematical model would have the following equation:

$$\text{Photohardened Thickness} = \sum_{Yk=0}^{Yk} G\{E\} = \quad [2]$$

$$\sum_{Yk=0}^{Yk} G\{P \exp[-2((Y - Yk/ro)^2)]/(\sqrt{2\pi} \; v \; ro)\}$$

Where, Y represents the distance from the center of the first scan vector in a direction normal to the scan direction and parallel to the image plane, the image plane being surface 46 in FIG. 1, Yk represents the locus of the center of each vector scan relative to $Y=0$, summed for its effect on adjacent lines.

It was discovered in our research, however, that this mathematical model is far inferior to a model based on a summation of the continuous scan exposures operated on afterwards by the exposure response of the composition as related to thickness of photohardening. Such a mathematical model has the following equation:

$$\text{Photohardened Thickness} = G\{\Sigma E\} = \quad [3]$$

$$G\left( \sum_{Yk=0}^{Yk} P \exp[-2((Y - Yk/ro)^2)]/(\sqrt{2\pi} \; v \; ro) \right)$$

where, the exposure contribution from each vector scan located along locations Yk is summed first for each individual location Y then the exposure response G{} is applied to that sum of exposure.

Figure 6:
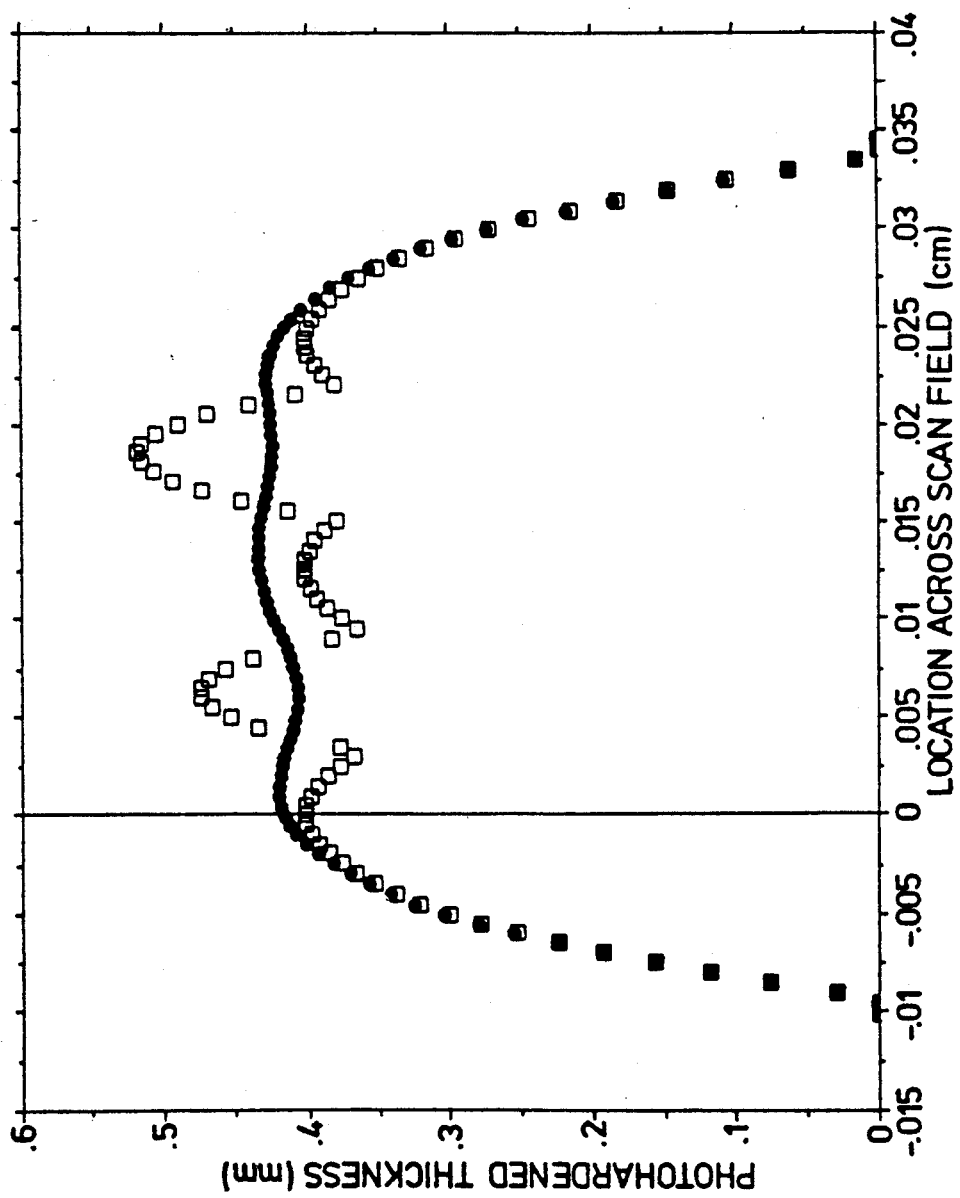
FIG. 6 shows the comparison between two calculated curves aiming to predict the thickness of photohardening across three consecutive scan lines.

The determination of accuracy of equation [3] over equation [2] may be easily understood by noting from the graph of FIG. 6 that a mathematical model based on equation [2] in which three continuous scan lines are drawn with a specific spacing predicts erroneously that ripples on the bottom of the photohardenable composition will have twice the frequency than that which equation [3] predicts for drawing the three lines with the same spacing. Measurements made from photomicrographs of layers formed, by scanning lines parallel to each other at an equivalent spacing onto the surface of the composition described in example 1, confirm that the ripple frequency predicted by equation [3] matches the actual composition response.

Figure 7:
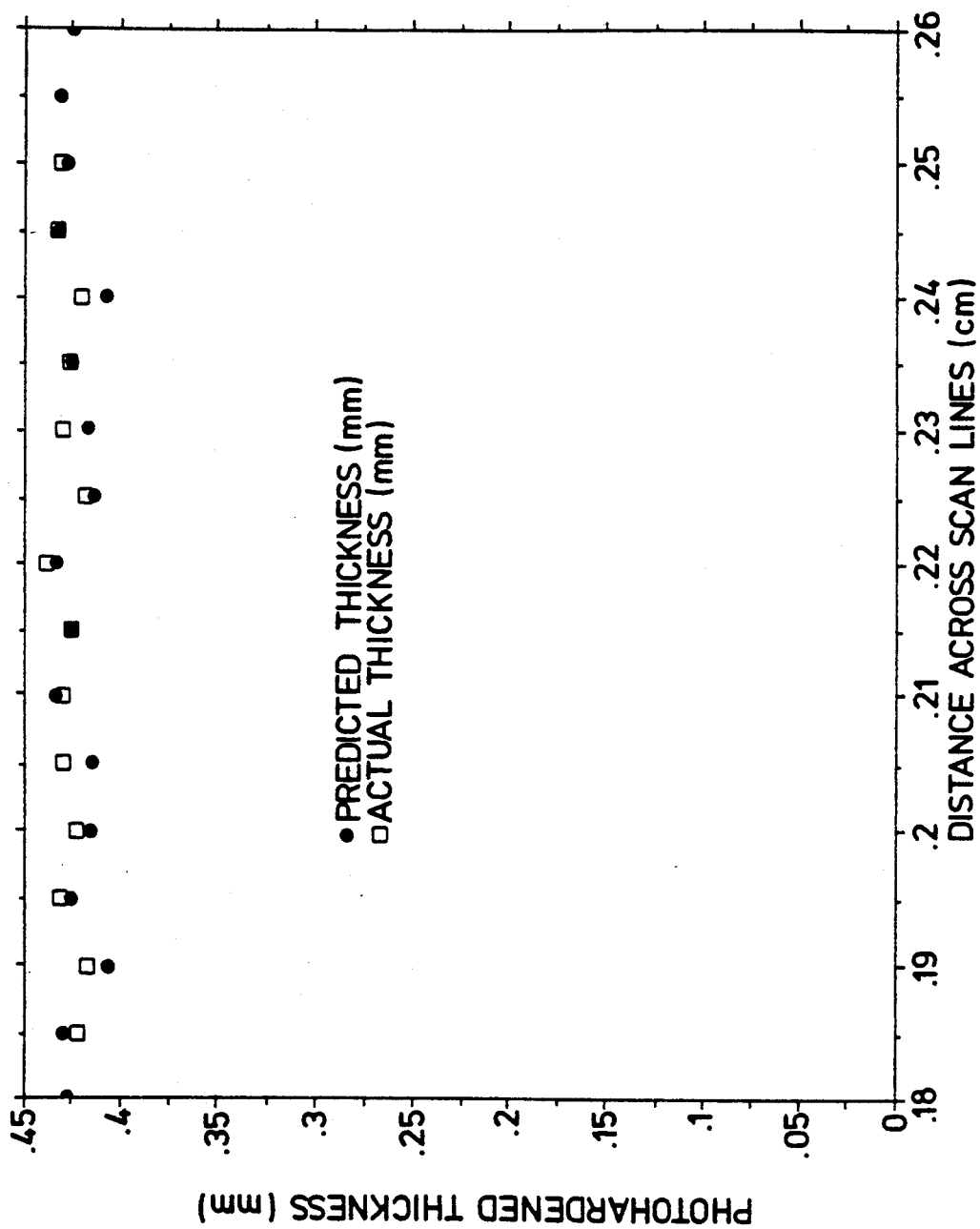
FIG. 7 compares the actual versus the calculated thickness across scan lines.

Further evidence that the mathematical model of equation[3] is an accurate predictor for the photohardenable composition response is shown in FIG. 7, wherein it is demonstrated that the model substantially predicted the thickness of photohardening.

As pointed out earlier, a second significant difference between conventional two dimensional imaging and solid imaging manifests itself on the lower surface of each layer. With two dimensional scanning, such as used with silver halide films, it is common practice for the scan spacing (i.e., the distance between scan lines while imaging the film) to be as wide as the $1/e^{\wedge}2$ diameter of the beam focus at the image plane. Some scanners provide tighter line spacing but rarely less than the $1/e \wedge 0.693$ diameter of the beam. With two dimensional imaging this relatively wide spacing is adequate for several reasons. One of the main reasons is that the unaided human eye is not sensitive to the variations in image darkness density that tighter scan spacings would reduce. Solid Imaging on the other hand, especially when high resolution parts are to be made, requires tighter scan spacing than that of two-dimensional imaging. This is because the non-gaussian material thickness response to the exposure would not overlap enough to give uniform depth of photohardening into the photohardenable composition. For Solid Imaging, the scan spacing should be preferably equal or less than the full width half maximum or $1/e \wedge .693$ diameter of the imaging beam at the imaging plane to minimize the bottom side ripple. The curves of FIG. 8, derived from a prediction based on the mathematical model of equation [3], show the change in ripple, due to changes in continuous beam scan spacing, on the bottom side of an imaged layer of the composition of example 1, where maximum thicknesses of the layer is to be .127 mm. Note that with a scan spacing equal to the 1/e spot diameter, a significant portion of the layer is segmented between the scan centerlines.

Figure 8:
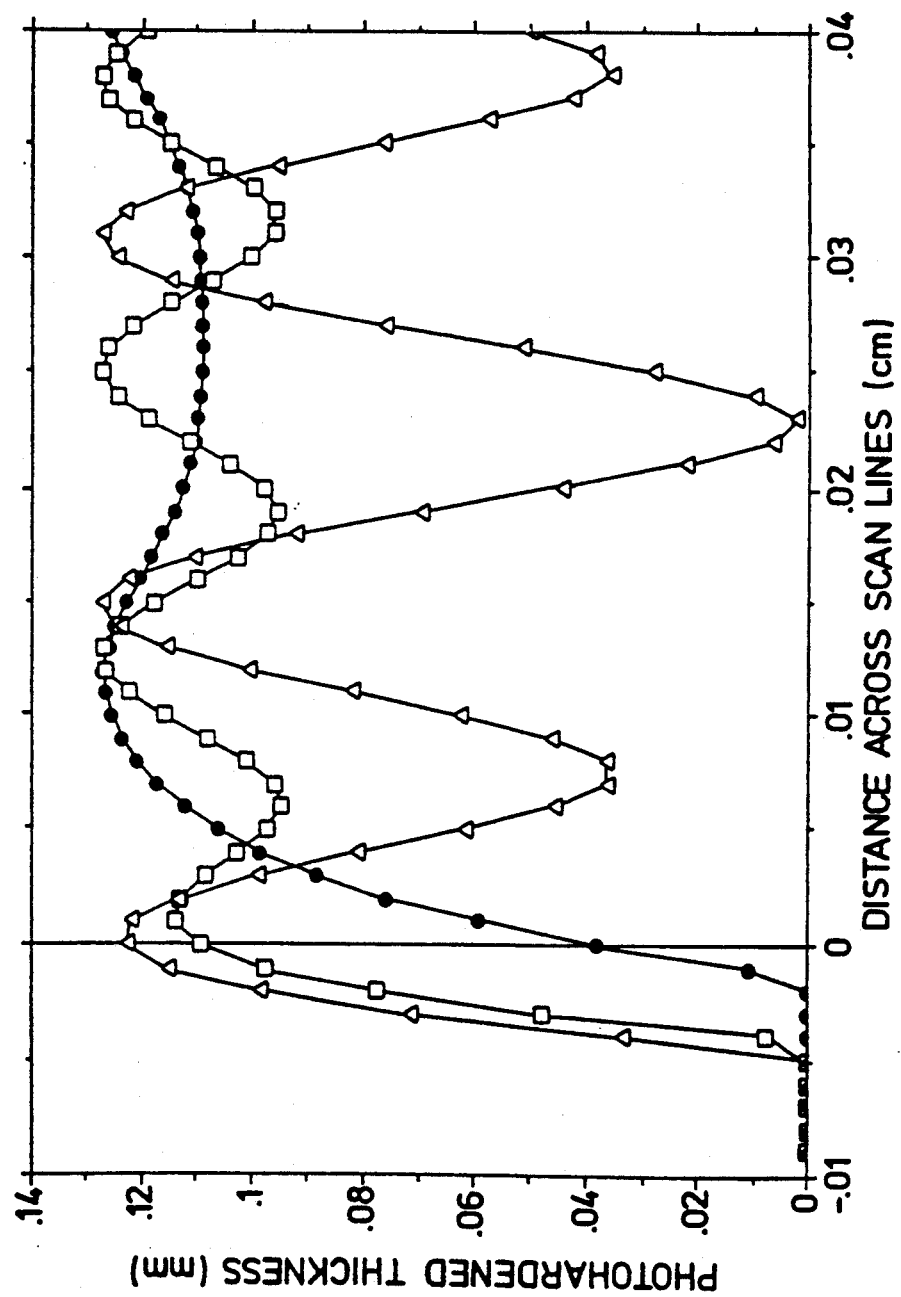
FIG. 8 shows the effect of scan spacing on cross sectional thickness of photohardening.

The effect of such segmentation between the scan centerlines is worthy of more discussion. Characteristically, the stiffness of a layer varies by the cube of the thickness. That is, if the thickness is decreased by two, the stiffness of that layer will decrease to one eighth its previous value. In FIG. 8, the material continuously scanned with a spacing of 1/e beam diameter, has regions where the thickness drops to 30% of the maximum thickness. For such a layer, the relative stiffness in this low region, and consequently the stiffness in the direction normal to the scan lines, will drop by a factor of 98.7%. Even at a scan spacing of $1/e \wedge .693$ beam diameters, the stiffness of the layer in the direction normal to the scan can be expected to be only 36% as strong as that of the scan direction. At a scan spacing of $1/e \wedge 0.5$ the stiffness reduces to 65% of maximum in this direction. This difference in stiffness leads to failure to a self supported layer, induces curl in the layer due to variability in stresses within the material, and can be viewed as a loss of tolerance in the final part if the layer formed has no portion of the part under it (i.e., it is a cantilevered or bridging section).

Figure 9:
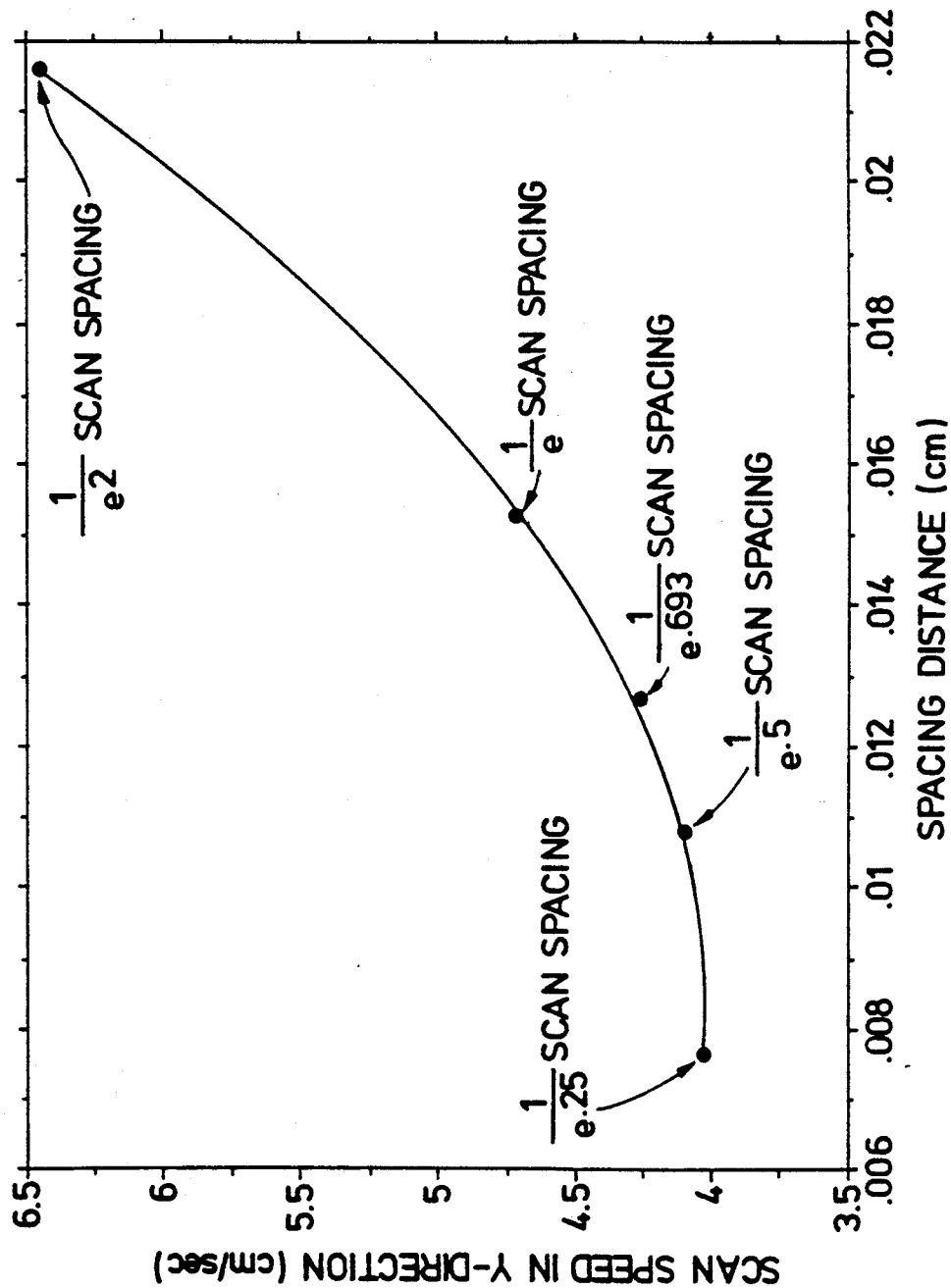
FIG. 9 illustrates the relationship between speed of creating scan lines versus scan spacing.

However, there is a trade off involved in going to a tighter scan spacing. Since there is a higher density of scan lines it takes longer for the layer to form. This extra time fortunately becomes less significant since scanning along the line must be speeded up to maintain the same depth of photohardening. The curve of FIG. 9 shows the change in layer formation speed in the direction normal to the scan as a function of scan spacing. Note that as the scan spacing gets tighter, the layer formation speed actually flattens out. Actually this speed should be adjusted for time losses involved in vector mirror settling at the end of each vector scan line.

Determination of the scan spacing is important since it directly leads to definition of the dimensions for a voxel as aforementioned, and therefore the resolution and tolerance capability of the Solid Imaging System. By this definition, the X, Y, and Z dimensions of a voxel are equal to each other and to the scan line spacing distance. The depth and width of photohardening will vary depending on the material exposure characteristics and the beam characteristics. It is preferable that the depth of photohardening is comparable to, or in other words of the same order of magnitude as the width of photohardening in the case of a single scanned line. In the case of overlapping multi-scanned lines, the exposure of photohardening should be accordingly changed depending on the spacing distance between the scanning lines. It is preferable that the scan spacing distance has a value less than or equal to $1/e \wedge .693$ spot diameter of the exposure beam at the image plane.

As aforementioned, with the known deflection systems for vector scanning of radiation beams such as lasers and the like, there is mass acceleration involved in reaching any beam velocity. This unavoidable non-uniformity in velocity results in unacceptable thickness variations, especially in the case of portions of layers having no immediate substrate under them. This is because in order to maintain reasonable levels of exposure at the high intensity it becomes necessary to use high beam velocities, and therefore, longer acceleration times, which in turn result in thickness non-uniformity if the exposure energy is not properly controlled during periods of acceleration. Although with low power lasers the thickness non-uniformity is somewhat negligible during the acceleration period, the use of low intensity lasers does not provide a good solution, because the time of producing a solid object becomes excessively long.

If we view the scanning exposure and the material response by taking a slice parallel to the scan direction and normal to the imaging plane, rather than slicing normal to the scan direction, we would find that, for a continuous constant power beam scan made at constant velocity, the depth of photohardening of the material would be constant and without ripple. However, if conventional vector scanners are used, the velocity of the scan will generally be varying considerably unless special provisions are taken. The velocity changes occur at the beginning of each vector as the scanner mirrors accelerate to maximum angular speed and then accelerate from maximum angular speed to a stop at the end of a vector. The spot velocity varies linearly with the radius of scan, which is the distance of scan mirrors from the image plane, and non-linearly across the surface 46 of the photohardenable composition 40 in FIG. 1, since the image plane is usually flat in Solid Imaging and the vector scanner is usually located at a point centered at a distance above the image plane. To avoid these effects, the scanner is usually positioned at an adequately long distance away from the surface of incidence 46 so that the non-linear variations in speed are negligible for all practical purposes. The optics also are selected such that the depth of focus of the exposing beam is sufficiently long to allow the beam 12'' to be substantially collimated at all points in the surface of incidence 46.

The optics in the preferred system are all coated for optimum transmission of the laser beam operating preferably in the ultra violet region. First the laser beam 12 passes through a mechanical shutter which is used as a means to block off the beam in the event a safety interlock is opened. Next, it is focused and collimated to a diameter that is optimum for the static and dynamic operation of the acousto-optic modulator. Following the beam collimation optics, the light is transmitted through a wedge that allows the beam direction to be changed horizontally in order to cause it to enter the acousto-optic modulator crystal at the Bragg angle. The beam diameter while passing through the acousto-optic modulator is fairly uniform and of a size that allows maximum diffraction efficiency to the first order in the static on state, while giving excellent modulation efficiency at the switching speed dictated by the second computer control means 34. The switching speed is usually of the order of two to twenty megahertz for the production of thin layers. After passing through the acousto-optic modulator, the zeroth order beam, when there is to be no exposure, (or the zeroth, first and typically other order beams, when there is to be exposure), is passed through another wedge which realigns the beam(s) horizontally down the remaining optical path. After the wedge, the beam(s) is (are) expanded with a negative lens. Then the expanded zeroth and other order beams, with the exception of the first order beam, are blocked from further transmission down the optical path. The first order beam, if present, is allowed to continue down the optical path where it is passed through a long focal length lens, and directed through the X-Y scan mirrors 20 and 22, which mirrors reflect it down as beam 12'' to the surface 46 of the photohardenable composition 40. The distance from the mirrors to the surface 46 is slightly less that the focal distance of the last lens. The focal length of the last lens is long, and therefore the scan radius is long, to ensure that the optical system has fairly uniform focal diameter in the entire image surface, and that the beam will have low astigmatism due to scanning angle. Calculations for the optimum beam diameter passing through the acousto-optic modulator for a given switching frequency are well known in the art and therefore have not been detailed here for the sake of brevity.

When these conditions are met, the variation in the spot velocity of a continuous beam scan translates directly to a variation in the thickness and depth of photohardening in the direction of the scan (X direction) and in the direction normal to the scan (Y direction). Spot, as explained before, is the intercept of beam 12'' with surface 46. If the scan beam is continuous, equation [3] may be used to calculate the thickness of photohardening at any location $l(X,Y,t)$ on the surface 46, provided that the velocity of the spot is known at that point and the velocity is not varying along the Y direction (i.e., the scan velocity has infinite radius of curvature in the image plane).

In the case of vector scanning, and more particularly in the case of the apparatus used to demonstrate the present invention, a maximum allowable acceleration of the deflection means (with one mirror rotating) is set to specified value and a corresponding appropriate scan radius is employed. Some typical system specifications are as follows:

the voxels generated by the deflection means are equal in X, Y and Z dimensions and the desired size for each voxel is 0.0127 cm (0.005'') in these dimensions.

the depth of photohardening (cm) achieved, using a material with an exposure, as a function of beam irradiance $G\{\Sigma E(mJ/cm^{\wedge} 2)\}$ is expressed by the function operator:

$$G\{\Sigma E\}(cm) = -0.066 + 0.0446 \ln[\Sigma E] - 0.00356 (\ln[\Sigma E])^{\wedge} 2 \quad [4]$$

For a material of $G\{\Sigma E\}$ sensitivity to produce a $D=0.0127$ cm deep voxel with 300 mW of laser power in a 0.0127 cm $1/e \wedge .693$ diameter spot (or $ro=0.0108$ cm $1/e \wedge 2$) at the image plane and scanned in a single line, the maximum velocity (Vxmax) of scan is determined by combining equation [1] and equation [4] andequation [4] and solving the resulting quadratic equation:

$$Vxmax = \text{Exp}\,[(\tfrac{1}{2}C)\,((B + 2C \ln[P/\sqrt{2\pi}\ ro] - \quad [5]$$

$$\sqrt{(B + 2C \ln[P/\sqrt{2\pi}\ r_o])^2 - 4C(A - D + B \ln[P/\sqrt{2\pi}\ r_o] + C(\ln[P/\sqrt{2\pi}\ r_o])^2)}]$$

Where A, B, and C represent the material coefficients in the material response equation G{ΣE} (ie. A = −.066..., B = .0446..., and C = −.00356...).

We can now easily solve for the time and distance it takes for the scanner to reach the maximum velocity. In this case it takes about 7.02 milliseconds but must travel 4.65 cm till the proper exposure is reached. During this time and travel distance, the material is severely overexposed and the depth of photohardening is much deeper than desired. In other words, the scanning system does not provide adequate resolution of the exposure energy to produce a part (a line in this case) of desirable tolerance, when no additional provisions are made.

Figure 10:
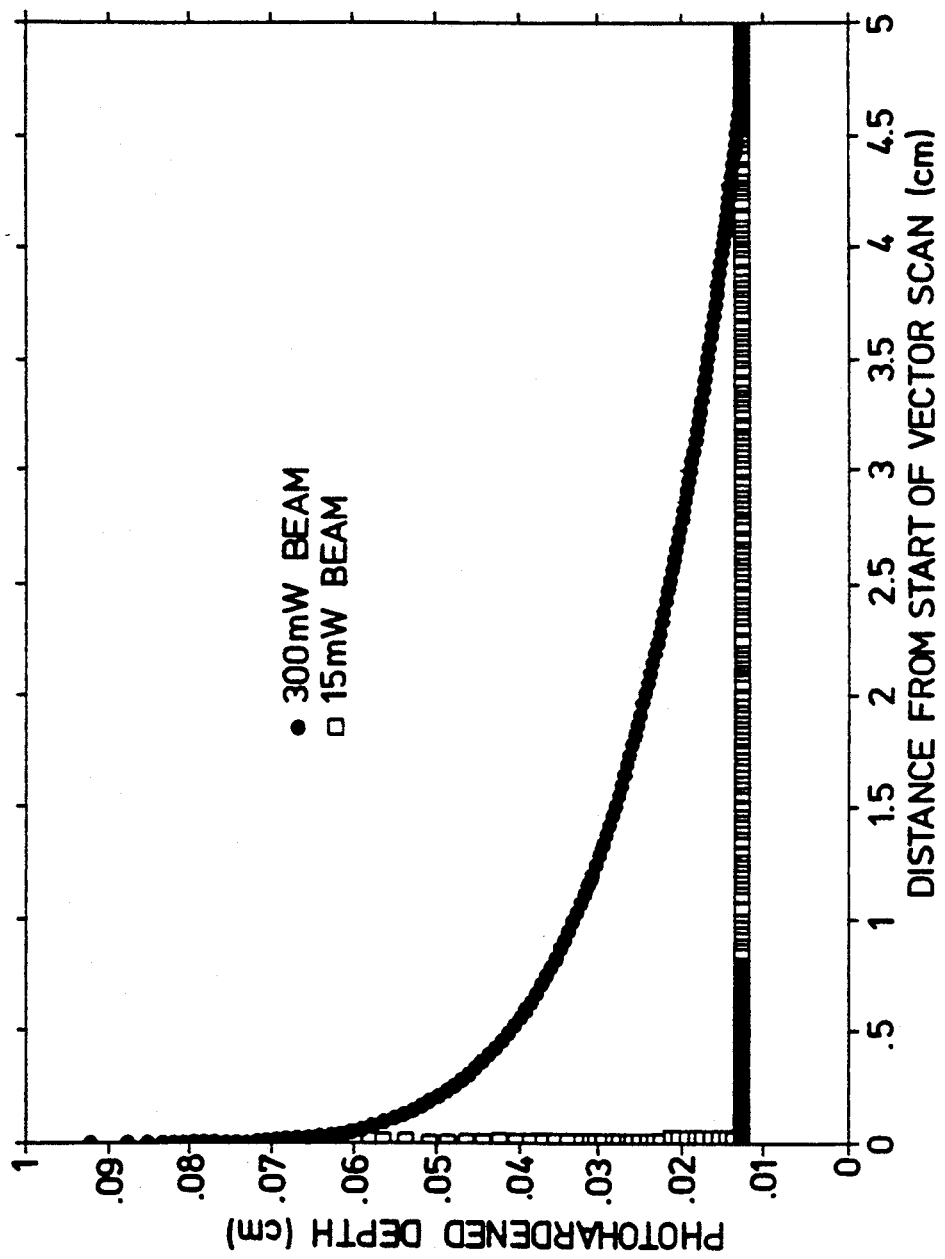
FIGS. 10 and 11 illustrate the large difference that the beam intensity makes on the vector scan distance required to reach a minimum constant depth of photohardening, under maximum acceleration from a stop when no provisions are taken to maintain constant exposure level.
Figure 11:
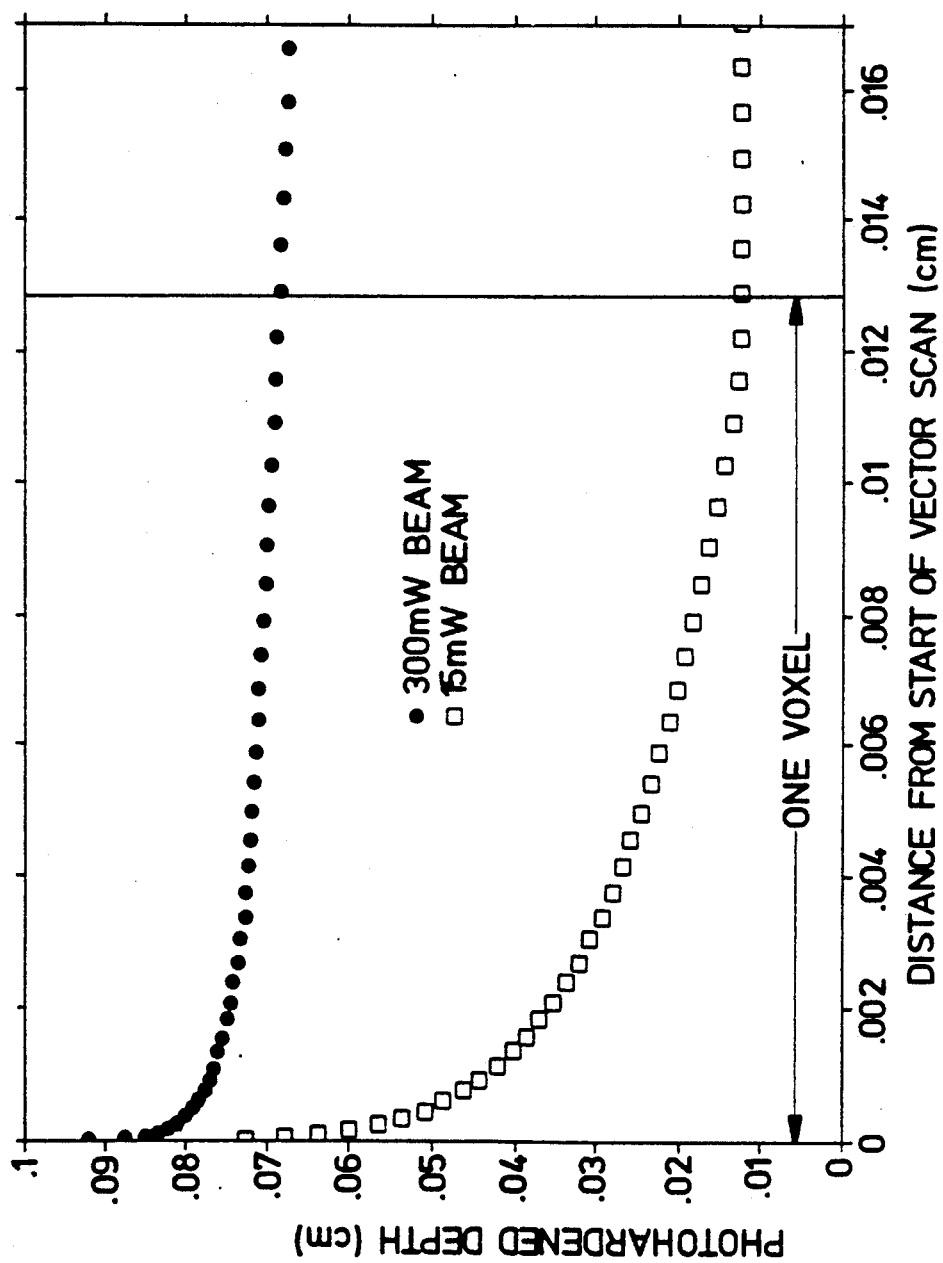

FIGS. 10 and 11 depict the overexposure and loss of depth of photohardening tolerance during this acceleration period. Note that for a vector scanning system such as we have described, a beam, such as beam 12″ 959 in FIG. 1, having an intensity of 300 mW, which would potentially provide greatly improved scanning speed, it it stayed continuously on during the scan, would not produce the desired level of exposure and therefore depth of photohardening in the photosensitive material until around 4.65 cm of travel. Since this excessive exposure occurs at the end of the scan and also as the scanner decelerates to a stop, the scanner system with a 300 mW beam is incapable of scanning a layer of desired thickness in all portions of the image plane, the image plane being the surface 46 in FIG. 1. FIG. 11, being a magnification of the initial part of the curve shown in FIG. 10, shows that even the 15 mW beam continuously on during scanning looses about one voxel to overexposure at the beginning of each scan line. A similar overexposure would also occur at the end of each vector. It is not only the depth of photohardening at the desired points of exposure that is affected, but also the thickness of photohardening in regions surrounding the scan line.

This loss of tolerance at the beginning and end of individual vectors would also be evident in a series of vectors placed next to each other in order to fill a layer that represents the part cross-section. The layer would attain extra depth of photohardening at the edges that correspond to the beginning and end of the vector fill. The fact that this extra depth of photohardening occurs at the edges leads to loss of tolerance of the total part or rigid object, since a part is usually measured for tolerance compliance at its outer surface. Thus, the part would tend to be wider than desired at each cross-section, holes would be smaller in diameter than desired (since in vector scanning the hole represent another beginning and end of a vector), and deeper than desired in cantilevered, bridging, or angled sections. Although in the exemplary case of the 15 mW beam described above, the rigid object thus made might still be barely acceptable depending on the tolerance set limits, the part or rigid object made with the 300 mW beam would certainly be excessively and grossly distorted.

Utilization of exposure control on the other hand allows the use of higher power lasers and therefore greater scanning speeds with substantially improved exposure resolution and therefore the ability to meet considerably tighter part tolerances. Basically, in a preferred embodiment of the instant invention, exposure control provides equal exposure over the scan vector by assuring that the laser beam is turned on for a set period of time per distance that the spot moves on the surface of the photohardenable composition. As explained before, the laser beam is modulated to break up the exposure into a multiple of exposures for each voxel. The power or intensity of the beam during each exposure is the same and the time of the exposure pulse is the same (except at the beginning and end of each vector as will be explained later) providing substantially more uniform exposure along the vector scan line.

The generalized equation of exposure for such a modulating vector scanning system using digital square wave time pulses of equal time width (w) and accelerating from a stop to a maximum velocity is:

$$1/(\pi r_o^2) \sum_{Y=0}^{Y_k} \sum_{X=0}^{X_p} \text{Exp}\ [-2\ (Y -\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ [6]$$
$$Y_k)/r_o]^2] \int_t^{t+w} P\ \text{Exp}[-2((0.5\ a\ t^2 - X_p)/r_o)^2]dt$$

Where t represents the time at the beginning of a vector, $Y_k$ represents the centerlines of each scan at a distance normal to the scan direction starting from scan line $Y_o$, $X_p$ represents that distance where each pulse is located along the scan line starting at $X_o$ and "a" represents the acceleration of the spot in the direction of scan.

The integral of equation [4] is somewhat easier to deal with in terms of X and can be rewritten in the following form:

$$\int_{X_p}^{X_p + w(2X_p a)^{0.5} + 0.5 a\ w^2} (P/(2X\ a)^{0.5})\ \text{Exp}\ [-2\ ((X - X_p)/r_o)^2\ dx \ \ \ \ \ \ \ \ [7]$$

Typically, when using the integral of equation [7] in place of the integral in equation [6] to calculate the exposure at a point within the image plane, one must sum the exposure contribution of pulses that exist one and a half to two times the $1/e^2$ (three to four sigma) radius from the point. Once the entire exposure is calculated about this point, the operator function described in equation [4] can be used to predict the value of exposure at that point.

Thickness of photohardening was calculated, using digital computer approximation methods, for a vector scan surrounded by other vector scans at a spacing of $1/e^{0.693}$ diameter of the beam spot that had voxel sizes of 0.0127 cm in each dimension and the pulses of the spot occurring four times per voxel as the beam accelerated from a stop. The radius of scan was increased giving a spot acceleration of $1.27 * 10^6$ cm/sec$^2$. The spot was digitally pulsed for $w = 3.93 * 10^{-6}$ sec per pulse and the beam power at the image plane was 150 mW.

Figure 12:
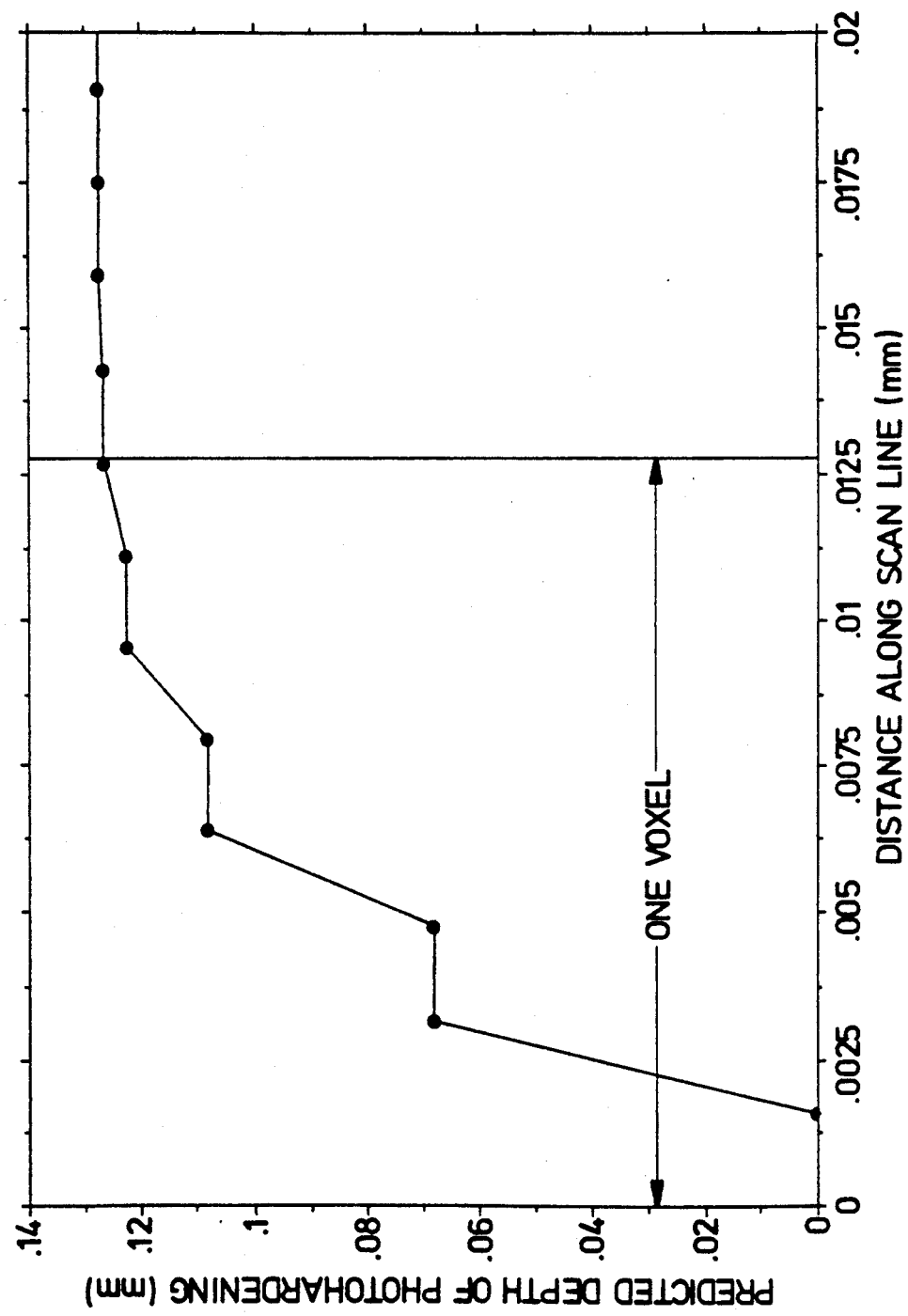
FIG. 12 shows the depth of photohardening versus distance along the direction of scan when provisions have been taken to maintain substantially constant exposure level.

FIG. 12 shows the predicted depth of photohardening for such a scan. The curve shows the predicted depth along the center of the scan line, which by definition is the depth of photohardening. Notice that the depth of photohardening along the scan line attains the desired constant value after traveling about one voxel, or a distance equal to the scan spacing. A one voxel length loss at the beginning and end of each vector or beginning and end of each fill plane, when exposure control is employed, represents a significant improvement over what is obtained when a continuous beam scan is utilized. Higher power exposure beams can be utilized with exposure control allowing much faster scanning speeds. However, the loss of one voxel at the beginning and end still translates to a loss of that much with respect to a set tolerance in the desired dimensions for a part.

A clear understanding of the reason for the loss of the first voxel must be attained in order to further improve the capability of a vector scanning system utilizing exposure control to meet a preset tolerance. Referring to equation [6] and the fact that the exposures of adjacent spots must be summed to calculate the total exposure at a point, it may be realized that at the beginning of a vector, the adjacent exposures do not exist behind but only forward of the scan. This means that the first voxel of a scan receives about one-half the exposure received by the voxels that follow it. This is further compounded by the fact that the encoder attached to the mirror, which encoder provides information for generating the pulses, must move about one pulse before a signal is generated. So typically the first voxel in the case shown in FIG. 12 above would receive one-quarter less exposure than calculated.

It would be possible to increase the amount of pulses per voxel and so reduce the percentage of pulse exposure loss due to pulse loss in the encoder. This would require an increase in pulse density on the encoder which may eventually limit the speed of the scanner due to pulse slew rate limitations. This also would require that the pulse time width be reduced proportionally, which would eventually erode the optical efficiency of the beam switch reducing the overall power in the beam and reducing the maximum beam velocity or scanning speed.

Reduction in the scan radius (length of beam 12" in FIG. 1) would increase the pulse density, but would not allow the scanning of as large a field and also would be eventually self defeating because of loss of optical efficiency in the system when the pulse time widths are reduced proportionately to reduce the exposure.

The preferred solution is to give an increased pulse time duration to the first few pulses within the first voxel at the beginning of the scan line and last voxel at the end of the a scan line. This would not slow down the scanning system and would not have any negative effects on any other part of the scanning system, but it would allow the regain of the voxels at the beginning and end of each vector.

In operation, the radiation means 10 shown in FIG. 1, which is preferably a high power laser, provides a radiation beam 12 having an intensity as aforementioned. The radiation beam 12 passes through a modulator 14, where its intensity may be modulated from zero intensity level to a maximum beam intensity having a value less than that of the unmodulated beam intensity, due to energy losses. Different kinds of modulators can be used including both digital and analog types. The digital type is preferable since it incorporates higher electronic stability and flexibility to the system, acousto-optical modulators being preferred. For high energy non solid state lasers, special modulator arrangements have to be made, as explained above. The modulated radiation beam 12', having somewhat decreased intensity due to losses, passes in turn through deflection means 16 such as a vector scanner in the form of a two-mirror 20 and 22 assembly, each mirror separately driven by a different motor 24 and 26 respectively. Mirror 20, driven by motor 24 deflects the beam in an X direction, while mirror 22 deflects the beam in a Y direction, X direction being perpendicular to the Y direction. The radiation beam 12", also somewhat lower in intensity due to additional losses, is directed towards a thin layer 48 closest to the surface 46 of a photohardenable composition 40, which is contained in a vessel 44, where it induces photohardening of preselected portions of the thin layer 48. The composite movement of the beam is a vector type movement, and the beam is said to move or be scanned in a vector mode. Due to the inertia of the electromechanical deflection means 16, the velocity of the beam 12" on the thin layer 48 is also limited by the inertia and the electromechanical nature of the deflection means 16.

The deflection of the two mirrors 20 and 22 through motors 24 and 26 respectively is controlled by the second computer control means 34, while the graphic data corresponding to the shape of the solid object under production are stored in the first computer control means 30.

The second computer control means 34 is coupled with the modulation means 14, the deflection means 16, and the first computer control means 30, through control/feedback lines 50, 54, and 58, respectively. The graphic data stored in computer control means 30 are fed to computer control means 34, and after being processed cause motors 24 and 26 to turn and move mirrors 20 and 22 accordingly in order to deflect the radiation beam towards predetermined positions on the thin layer 48. Electrical feedback regarding the relative movements of the mirrors 20 and 22 is provided by the deflection means to the second computer control means 34 through line 54. This feedback, being correlatable to the velocity and average residence time of the beam on the predetermined portions of the thin layer 48, is processed by the second computer control means 34, and it is fed to the modulation means 14 as a control command through line 50 in order to modulate the intensity of beam 12 so that the product of the intensity of beam 12 and the average residence time at each position of the predetermined portions of layer 48 remains substantially constant. Thus, the exposure level, being by definition the product of these two parameters, remains substantially constant. By maintaining the exposure level constant over the predetermined portions of each successive thin layer, the depth of photohardening is also kept substantially constant. This correction or compensation is very important, especially at unsupported portions of the thin layers, where swollen edges will appear as a result of overexposure due to the low initial velocity at the edges in vector scanning as explained above. The higher the intensity of the beam 12" or the higher the photosensitivity of the photohardenable composition the more severe this problem becomes in the absence of means to maintain the exposure level constant. Also, the greater the sensitivity of the composition 40, the more severe the problem becomes without some means of exposure control.

The movable table 41 is initially positioned within the photohardenable composition 40, a short predetermined distance from the surface 46, providing a thin layer 48 between the surface 46 and the table 41. The positioning of the table is provided by the placement means 42, which in turn is controlled by the first computer control means 30 according to the data stored therein. The graphic data corresponding to the first layer of the shape of the rigid object are fed from computer control means 30 to computer control means 34, where they are processed along with feedback data obtained from deflecting means 16, and are fed to modulator 14 for controlling the same, so that when the beam travels in a vector mode on predetermined portions of the thin layer 48, the exposure remains constant.

When the first layer of the rigid object is complete, the movable table 41 is lowered by a small predetermined distance by the placement means 42 through a command from first computer control means 30. Following a similar command from computer means 30, layer forming means, such as doctor knife 43 sweeps the surface 46 for leveling purposes. The same procedure is then followed for producing the second, third, and the following layers until the rigid object is completed.

The modulator as mentioned earlier modulates the intensity of the radiation beam from a substantially zero intensity level to a maximum intensity in an analog or digital mode. There are some optical losses in the modulator system and also some additional losses in the deflection means. The maximum intensity equals the intensity of the unmodulated beam minus total optical losses. In a preferred embodiment of the instant invention, the maximum beam intensity is in excess of a certain value, depending on the photospeed of the photohardenable composition and other parameters. Thus, it is preferable that the maximum intensity of the radiation beam provides a depth of photohardening which is greater than:

Photohardened Thickness = $G\{\Sigma E\}$ =

$$G\left\{ \sum_{Yk=0}^{Yk} P\exp[-2((Y-Yk/ro)\char`\^2)]/(\sqrt{2\pi}\ v\ ro) \right\}$$

Where, $G\{\Sigma E\}$ represents a function $G\{\}$ operating on the sum of exposure E, such function operator relates a specific material photohardened depth response (cm) to the sum of exposure (mJ/cm $\char`\^$ 2) received at a specific point or region. Usually this function operator is a natural log second order polynomial fit of the form:

$G\{\Sigma E\}$ = Photohardenable Depth = $A + B \ln\{E\} + C (\ln[E])\char`\^2$ Where, A, B, and C are coefficients for a specific material that provide a good mathematical fit for the relationship.

Y represents any location (cm) of interest in a direction normal to the scan direction in the image plane.

Yk represents any central location (cm) of a scan line relative to location Y=0 in the image plane.

ro is the 1/e $\char`\^$ 2 radius (cm) of the beam at the intersection of the beam and the image plane of the photohardenable material.

v is the velocity (cm/sec) of the beam spot on the surface in the image plane

The vectors of the vector scanning may comprise a multiplicity of scan lines. This multiplicity of scan lines may include one or more groups of scan lines, the lines of each group being parallel to each other. The distance between two consecutive lines within a group is the scan spacing between the two lines, when the scan spacing is constant. However, in certain occasions the scan spacing may vary broadly form line to line. In the latter case, when the beam is scanning any first line, the scan spacing referring to said first line equals the distance between the first line and a second line, which among other neighboring lines is the closest in distance to the first line, and which is scanned after the first line has been scanned.

It is preferred that the distance traveled by the radiation beam on a scan line at maximum acceleration of the beam in order to reach maximum constant velocity from zero velocity level is greater than on time the scan spacing, more preferably 5 times the scan spacing, and even more preferably 10 times the scan spacing.

Modulator 14 may preferably be controlled through the second computer control means 34 to turn the radiation beam on and off in a manner of substantially square pulses, each pulse usually having substantially the same amplitude or intensity and the same duration as the rest of the pulses. As the beam scans the surface 46 of the photohardenable composition 40, the pulse frequency is arranged by computer means 34 and scan system 16 feedback means 54 to be proportional to the velocity at which the beam travels on the surface 46.

Photohardened Thickness = $G\{\Sigma E\}$ =

$$G\left\{ 1/(\pi ro\ \char`\^2) \sum_{Yk=0}^{Yk} \sum_{Xp=0}^{Xp} Exp[-2(Y-Yk)/ro)\char`\^2]* \int_{t}^{t+w} P\ Exp[-2((0.5\ a\ t\char`\^2 - Xp)/ro)\char`\^2]dt \right\}$$

Where, $G\{\Sigma E\}$ represents a function $G\{\}$ operating on the sum of exposure E, such function operator relates a specific material photohardened depth response (cm) to the sum of exposure (mJ/cm $\char`\^$ 2) received at a specific point or region. Usually this function operator is a natural log second order polynomial fit of the form:

$G\{\Sigma E\}$ = Photohardenable Depth = $A + B \ln[E] + C (\ln[E])\char`\^2$

Where, A, B, and C are coefficients for a specific material that provide a good mathematical fit for the relationship.

ro is the 1/e $\char`\^$ 2 radius (cm) of the beam at the intersection of the beam and the image plane of the photohardenable material.

P is the maximum irradiance (mW) of the beam at the image plane, which beam would provide a depth of polymerization greater than desired, under the circumstances dictated by the other parameters, were it not modulated in a manner dictated by the time integral.

X and Y represent a location (cm,cm) on the surface of the photohardenable liquid in the image plane.

Yk represents any central location (cm) of a scan line relative to location Y=0 in the image plane.

Xp represents any initial location (cm) along a scan line relative to location X=0 in the image plane which receives a beam pulse.

t represents the time (sec) at which a pulse begins to irradiate in the image plane.

w represents the length of time (sec) that an irradiating pulse lasts in the image plane.

"a" represents the acceleration (cm/sec $^2$) of the spot in the image plane dictated by the angular acceleration capacity of the reflecting mirror(s) scanner and the radius of scan.

Control of photohardening tolerances in the perimeter regions of a scanned layer through exposure control means is of special importance. The perimeter regions, which consist of the beginning and end of vectors and/or vectors with less exposure contribution from adjacent parallel vectors, receive less exposure and therefore have lower depth of photohardening in the Z direction as well as lower depth of photohardening in the X and Y directions. In a Solid Imaging process, as described, where objects are formed in layers, lower depth of photohardening leads directly to loss of dimensional tolerances in the X, Y and Z directions. But in addition, loss of depth of photohardening in the Z direction increases the potential for delamination between layers of the object This delamination occurs because formation of the photohardenable material in the Z direction is not adequate to form a bond with the previous layer. In a Solid Imaging process, formation of the bond between layers is effected by giving exposures slightly higher than that necessary to produce a photohardened layer of depth equal to the liquid layer depth above previously photohardened regions as depicted in FIG. 1 item 48. This delamination occurs at the perimeters of objects and has a significant effect on lamination of layers that produce thin wall sections.

The variables that must be controlled to prevent delamination are the beam power P (mW) in the image plane, the time t (sec) of exposure, the spot size ro (cm), the scan spacing Y(k+1)−Yk (cm), the distance between pulses X(p+1)−Xp (cm), and rescan techniques.

To prevent delamination and loss of tolerance, the beam power could be increased through analog means, such as an acousto-optic modulator previously described, to compensate for loss of net exposure in regions where exposure contribution from adjacent exposures is less. Or the the time of exposure could be increased by increasing the time width of the individual pulses of beam power through digital control means, such as a digitally pulsed acousto-optic modulator previously described, to compensate for loss of net exposure in regions where exposure contribution from adjacent exposures is less. Rescan techniques, such as scanning any perimeter of the photohardened layer before or after the layer is formed by parallel scan lines, would compensate for the lower exposure received at any perimeter of an object or layer.

Increasing the spot size, reducing the scan spacing or reducing the pulse spacing will improve adhesion between layers because the exposure is more uniform and more adhesion area will be attained, but use of these methods in perimeter regions to prevent delamination may have a detrimental effect on object tolerances.

In the preferred embodiment of this invention, the loss of tolerance and adhesion between layers in regions where exposure contribution from adjacent exposures is lower, whether this is due to effects at the beginning and end of vectors, previously described, or due to scan lines not receiving exposure contribution from adjacent vector scans, is compensated for by exposure time width pulse control of the digitally pulsed acousto-optic modulator.

Although the preferable way of modulating the radiation beam 12 is digital, modulation in an analog mode or combinations of analog and digital modes are within the limits of the realm of the instant invention.

The beam 12 comprises preferably ultraviolet radiation. However, it may also comprise infra red radiation, visible radiation, and combinations thereof with ultraviolet and other radiations, such as X-rays, electron beam, ion beam, and the like. Finally, the movement of table 41 may be translational, rotational, random, or a combination thereof.

A photohardenable composition for solid imaging should contain at least one photohardenable monomer or oligomer and at least one photoinitiator. For the purposes of this invention, the words monomer and oligomer have substantially the same meaning and they may be used interchangeably.

Examples of suitable monomers which can be used alone or in combination with other monomers include t-butyl acrylate and methacrylate, 1,5-pentanediol diacrylate and dimethacrylate, N,N-diethylaminoethyl acrylate and methacrylate, ethylene glycol diacrylate and dimethacrylate, 1,4-butanediol diacrylate and dimethacrylate, diethylene glycol diacrylate and dimethacrylate, hexamethylene glycol diacrylate and dimethacrylate, 1,3-propanediol diacrylate and dimethacrylate, decamethylene glycol diacrylate and dimethacrylate, 1,4-cyclohexanediol diacrylate and dimethacrylate, 2,2-dimethylolpropane diacrylate and dimethacrylate, glycerol diacrylate and dimethacrylate, tripropylene glycol diacrylate and dimethacrylate, glycerol triacrylate and trimethacrylate, trimethylolpropane triacrylate and trimethacrylate, pentaerythritol triacrylate and trimethacrylate, polyoxyethylated trimethylolpropane triacrylate and trimethacrylate and similar compounds as disclosed in U.S. Pat. No. 3,380,831, 2,2-di (p-hydroxyphenyl)-propane diacrylate, pentaerythritol tetraacrylate and tetramethacrylate, 2,2-di -(p-hydroxyphenyl)-propane dimethacrylate, triethylene glycol diacrylate, polyoxyethyl-2,2-di(p-hydroxyphenyl)propane dimethacrylate, di-(3-methacryloxy-2-hydroxypropyl) ether of bisphenol-A, di-(2-methacryloxyethyl) ether of bisphenol-A, di-(3-acryloxy-2-hydroxypropyl) ether of bisphenol-A, di-(2-acryloxyethyl) ether of bisphenol-A, di-(3-methacryloxy-2-hydroxypropyl) ether of 1,4-butanediol, triethylene glycol dimethacrylate, polyoxypropyltrimethylol propane triacrylate, butylene glycol diacrylate and dimethacrylate, 1,2,4-butanetriol triacrylate and trimethacrylate, 2,2,4-trimethyl -1,3-pentanediol diacrylate and dimethacrylate, 1-phenyl ethylene-1,2-dimethacrylate, diallyl fumarate, styrene, 1,4-benzenediol dimethacrylate, 1,4-diisopropenyl benzene, and 1,3,5-triisopropenyl benzene. Also useful are ethylenically unsaturated compounds having a molecular weight of at least 300, e.g., alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages particularly when present as terminal linkages. Particularly preferred monomers are polyoxyethylated trimethylolpropane triacrylate, ethylated pentaerythritol triacrylate, dipentaerythritol monohydroxypentaacrylate and 1,10-decanediol dimethylacrylate.

Examples of photoinitiators which are useful in the present invention alone or in combination are described in U.S. Pat. No. 2,760,863 and include vicinal ketaldonyl alcohols such as benzoin, pivaloin, acyloin ethers, e.g., benzoin methyl and ethyl ethers, benzil dimethyl ketal; α-hydrocarbon-substituted aromatic acyloins, including α-methylbenzoin α-allylbenzoin and α-phenylbenzoin. Photoreducible dyes and reducing agents disclosed in U.S. Pat. Nos. 2,850,445, 2,875,047, 3,097,096, 3,074,974, 3,097,097 and 3,145,104, as well as dyes of the phenazine, oxazine, and quinone classes, Michler's ketone, benzophenone, acryloxy benzophenone, 2,4,5-triphenylimidazolyl dimers with hydrogen donors including leuco dyes and mixtures thereof as described in U.S. Pat. Nos. 3,427,161, 3,479,185 and 3,549,367 can be used as initiators. Also useful with photoinitiators and photoinhibitors are sensitizers disclosed in U.S. Pat No. 4,162,162. Other suitable photoinitiation systems which are thermally inactive but which generate free radicals upon exposure to actinic light at or below 185° C. include the substituted or unsubstituted polynuclear quinones which are compounds having two intracyclic carbon atoms in a conjugated carbocyclic ring system, e.g., 9,10-anthraquinone, 2-methylanthraquinone, 2-ethylanthraquinone, 2-tert-butylanthraquinone, octamethylanthraquinone, 1,4-naphthoquinone, 9,10-phenanthraquinone, benz(a)anthracene-7,12-dione, 2,3-naphthacene-5,12-dione, 2-methyl-1,4-naphthoquinone, 1,4-dimethyl-anthraquinone, 2,3-dimethylanthraquinone, 2-phenylanthraquinone, 2,3-diphenylanthraquinone, retenequinone, 7,8,9,10-tetrahydronaphthacene -5,12-dione, and 1,2,3,4-tetrahydrobenz(a)anthracene -7,12-dione. The photoinitiator or photoinitiator system is present in 0.05 to 10% by weight based on the total weight of the photohardenable composition.

Although the preferred mechanism of photohardening is free radical photopolymerization, other mechanisms of photohardening apply also within the realm of this invention. Such other mechanisms include but are not limited to cationic polymerization, anionic polymerization, condensation polymerization, addition polymerization, and the like.

A preferred photohardenable composition is given in Example 1.

| EXAMPLE 1 | |
| --- | --- |
| Novacure 3704 | 29.6 |
| (Bisphenol A bis(2-hydroxypropyl) diacrylate) | |
| TMPTA | 29.6 |
| (Trimethylol Propane Triacrylate) | |
| Plasthall 4141 | 14.8 |
| (CP Hall Company) | |
| Triton X-100 | 0.78 |
| (Octyl phenol poly ether alcohol) | |
| Irgacure 651 | 1.6 |
| 2,2-dimethoxy-2 phenylacetophenone | |
| Core-Shell polymer* (RCP-1674) | 26.0 |

*The Core Shell polymer had a core of
Butyl acrylate 70%
Butylene glycol diacrylate 5%
Allyl methacrylate 25%
and a shell of 100% methyl methacrylate The core-shell polymer was prepared as follows:

Core 2388 gm of deionized water and 37.5 gm of a 30% aqueous solution of sodium dodecyl sulfonate were charged to a four-neck five liter flask equipped with a mechanical stirrer, condenser, heating mantle, addition funnel, thermometer and nitrogen inlet. The contents of the flask were purged with nitrogen, at room temperature, for 30 minutes and then heated up to 80° C. At that temperature, ⅛ of a monomer charge consisting of 1046 gm of butyl acrylate, 279 gm of allyl methacrylate and 70 gm of 1,4 butylene glycol diacrylate, was added in one shot. This was followed immediately by one shot additions of 19 ml of a 7% solution of sodium hydrogen phosphate, and 20 ml of a 5% solution of ammonium persulfate (both solutions were aqueous). The heat was turned off and the reaction mixture was allowed to exotherm. When the exotherm peaked at 84° C., the remainder of the monomer charge was added over a 90 minute period with intermittent heating to maintain the reaction temperature between 80° and 85° C. When the monomer addition was finished, the reaction mixture was heated at 80°-85° C. for an addition 2.5 hours. The final product was a bluish emulsion with 35.1% solids and had a particle size of 0.097 micron.

Shell 2000 gm of the core emulsion, described above, was placed in a five liter flask equipped similarly to the one used for the core synthesis. The contents of the flask were purged with nitrogen, at room temperature, for 30 minutes. After the nitrogen purge, the flask was charged, with stirring, with a mixture consisting of 1.45 gm ammonium persulfate, 2.9 gm of a 30% aqueous solution of sodium dodecyl sulfonate, and 332 gm of deionized water, over a 30 minute period. The contents of the flask were then heated up to 85° C., and 179 gm of methyl methacrylate were added over 60 minutes. When all the monomer had been added, the reaction mixture was heated for an additional 2 hours. The final product was a bluish emulsion with 36.2% solids and a particle size of 0.107 micron. The core to shell ratio was substantially 4:1.

The bluish emulsion was placed in a freezer for 3 days and then it was thawed, filtered, washed with deionized water, and dried at room temperature for about 3 days. For large samples, such as in the case of semiworks or plant batches, spray drying techniques involving hot air of 100° to 150° C. may be used.

What I claim is:

1. A process for maintaining a constant exposure level during fabrication of an integral three-dimensional rigid object from successive thin layers of a liquid photohardenable composition comprising the steps of:

storing graphic data, corresponding to the shape of the rigid object desired to be fabricated, in a first computer control means, placing the liquid photohardenable composition in a vessel, generating a radiation beam having an intensity by using radiaton means, using said first computer control means, controllably deflecting said radiation beam in a vector scanning mode to predetermined positions on the successive thin layers in order to induce photohardening of preselected portions of the liquid photohardenable composition to a depth of photohardening, and also deflecting the radiation beam with an acceleration from zero level to a maximum acceleration, and with a velocity from zero level to a maximum velocity by using deflection means, coupling a second computer control means with, said deflection means, and said first computer control means, said second computer control means being used in conjunction with a modulation means for controllably modulating the intensity of the radiation beam from a substantially zero intensity level to a maximum intensity, in proportion to the velocity of said beam, thereby providing a substantially constant exposure level, said exposure level being substantially independent of the velocity of said beam, on the predetermined portions of the liquid photohardenable composition in order to achieve substantially constant depth of photohardening within each successive thin layer, supporting the rigid object on a movable substantially flat table within the vessel, controllably moving the flat table by using placement means, the placement means being controlled by the first computer control means, and forming the successive thin layers of the liquid photohardenable composition by layer forming means, the layer forming means being controlled also by the first computer control means.

2. A process ad defined in claim 1, wherein the maximum intensity of the radiation beam causes a depth of photohardening which is greater than a value given by:

$$G\{\Sigma E\} = G\left\{ \sum_{Yk=0}^{Yk} P \exp[-2((Y - Yk/ro)^2)]/(\sqrt{2\pi} \, v \, ro) \right\}$$

where, $G\{\Sigma E\}$ is an equation that mathematically fits the photohardened material's depth to exposure E (mJ/cm $^2$) response curve, Yk (cm) represents the center of each scan line located relative to Y=0 in the image plane, Y (cm) is a variable location with axis running normal to the scan direction, P is the irradiance (mW) in the exposing beam at the image plane, v is the velocity (cm/sec) of the beam spot at the image plane, and ro is the 1/e $^2$ radius (cm) of a gaussian beam spot intersecting the image plane.

3. A process ad defined n claim 2, wherein the vector scanning comprises multiple scan lines substantially parallel to each other, said lines having a scan spacing, and wherein the distance travelled by the beam on a scan line at maximum acceleration of the beam in order to reach maximum constant velocity from zero velocity level is greater than the scan spacing.

4. A process as defined in claim 3, wherein the distance traveled by the beam on a scan line at maximum acceleration of the beam in order to reach said specified maximum constant velocity from zero velocity level is greater than 5 times the scan spacing.

5. A process as defined in claim 4, wherein the distance traveled by the beam on a scan line at maximum acceleration of the beam in order to reach said specified maximum constant velocity from zero velocity level is greater than 10 times the scan spacing.

6. A process as defined in claim 3, wherein the intensity of the radiation beam is modulated into pulses at a specified frequency, each pulse having a specified duration and intensity.

7. A process as defined in claim 6, wherein the pulses are of substantially equal duration, substantially equal intensity, and of varying frequency proportional to said beam velocity.

8. A process as defined in claim 7, wherein the intensity of the radiation beam during acceleration of the beam provides a thickness of photohardening which is substantially equal to:

$$G\{\Sigma E\} = G\left\{ 1/(\pi ro^2) \sum_{Yk=0}^{Yk} \sum_{Xp=0}^{Xp} \exp[-2(Y - Yk)/ro)^2] * \int_{t}^{t+w} P \exp[-2((0.5 \, a \, t^2 - Xp)/ro)^2] \, dt \right\}$$

where, $G\{\Sigma E\}$ is an equation that mathematically fits the photohardened material's depth to exposure E (mJ/cm $^2$) response curve; ro is the 1/e $^2$ radius (cm) of a gaussian beam spot intersecting the image plane; Yk (cm) represents the beginning of each scan line located relative to Y=0 in the image plane; Xp (cm) represents the center of each beam pulse located relative to X=0 in the image plane, X (cm) being a variable location with axis running parallel to the scan direction; Y (cm) is a variable location with axis running normal to the scan direction; t (sec) is the time at which an individual beam pulse begins in the image plane relative to an arbitrary time t=0; w (sec) is the time width of each pulse, P is the irradiance (mW) in the exposing beam of each pulse at the image plane; and "a" is the acceleration (cm/sec $^2$) of the beam spot in the image plane.

9. A process as defined in claim 2, wherein the intensity of the radiation beam is modulated in an analog mode.

10. A process as defined in claim 2, wherein the beam comprises infrared radiation.

11. A process as defined in claim 2, wherein the beam comprises visible radiation.

12. A process as defined in claim 2, wherein the beam comprises ultraviolet radiation.

13. An apparatus for maintaining a constant exposure level during fabrication of an integral three-dimensional rigid object from successive thin layers of a liquid photohardenable composition comprising:

a vessel for containing the liquid photohardenable composition, radiation means for providing a radiation beam, the radiation beam having an intensity, modulation means for modulating the intensity of the radiation beam from substantially zero intensity level to a maximum beam intensity, deflection means for controllably deflecting the radiation beam in a vector scanning mode to predetermined positions on the successive thin layers in order to induce photohardening of pre-selected portions of the liquid photohardenable composition to a depth of photohardening, the deflection means also controllably deflecting the beam with an acceleration from zero level to a maximum acceleration, and with a velocity from zero level to a maximum constant velocity, first computer control means for storing graphic data corresponding to the shape of the desired rigid object, second computer control means coupled with said modulation means, said deflection means, and said first computer control means, said second computer control means being for providing a substantially constant exposure level, said exposure level being substantially independent of the velocity of said beam, on the predetermined portions of the liquid photohardenable composition in order to achieve substantially constant depth of photohardening within each successive thin layer, a substantially flat movable table within the vessel for supporting the rigid object, placement means controlled by the first computer control means for providing a motion to the movable table in order to accurately control placement of the moveable table within the vessel, and layer forming means located over the movable table, the layer forming means also being controlled by the first computer control means for forming the successive thin layers of the liquid photohardenable composition.

14. An apparatus as defined in claim 13, wherein the maximum intensity of the radiation beam provides a depth of photohardening which is greater than:

$$G\{\Sigma E\} = G\left\{ \sum_{Yk=0}^{Yk} P\exp[-2((Y - Yk/ro)^{\wedge}2)]/(\sqrt{2\pi}\, v\, ro) \right\}$$

where, $G\{\Sigma E\}$ is an equation that mathematically fits the photohardened material's depth to exposure E (mJ/cm$^{\wedge}$2) response curve, Yk (cm) represents the center of each scan line located relative to Y=0 in the image plane, Y (cm) is a variable location with axis running normal to the scan direction, P is the irradiance (mW) in the exposing beam at the image plane, v is the velocity (cm/sec) of the beam spot at the image plane, and ro is the 1/e$^{\wedge}$2 radius (cm) of a gaussian beam spot intersecting the image plane.

15. An apparatus as defined in claim 13 or 14, wherein the vector scanning comprises multiple scan lines substantially parallel to each other, the lines having a scan spacing, and wherein the distance traveled by the beam on a scan line at maximum acceleration of the beam in order to reach maximum constant velocity from zero velocity level is greater than the scan spacing.

16. An apparatus as defined in claim 15, wherein the distance traveled by the beam on a scan line at maximum acceleration of the beam in order to reach maximum constant velocity from zero velocity level is greater than 5 times the scan spacing.

17. An apparatus as defined in claim 16, wherein the distance traveled by the beam on a scan line at maximum acceleration of the beam in order to reach maximum constant velocity from zero velocity level is greater than 10 times the scan spacing.

18. An apparatus as defined in claim 15, wherein the intensity of the radiation beam is modulated into pulses at a frequency, each pulse having a duration, and an intensity.

19. An apparatus as defined in claim 18, wherein the pulses are of substantially equal duration, substantially equal intensity, and varying frequency.

20. An apparatus as defined in claim 19, wherein the intensity of the radiation beam during acceleration of the beam provides a thickness of photohardening which is substantially equal to:

$$G\{\Sigma E\} =$$

$$G\left\{ 1/(\pi ro^{\wedge}2) \sum_{Yk=0}^{Yk} \sum_{Xp=0}^{Xp} \exp[-2(Y - Yk)/ro)^{\wedge}2]* \right.$$

$$\left. * \int_{t}^{t+w} P\exp[-2((0.5\, a\, t^{\wedge}2 - Xp)/ro)^{\wedge}2\, dt \right\}$$

where, $G\{\Sigma E\}$ is an equation that mathematically fits the photohardened material's depth to exposure E (mJ/cm$^{\wedge}$2) response curve; ro is the 1/e$^{\wedge}$2 radius (cm) of a gaussian beam spot intersecting the image plane; Yk (cm) represents the center of each scan line located relative to Y=0 in the image plane; Xp (cm) represents the beginning of each beam pulse located relative to X=0 in the image plane, X (cm) being a variable location with axis running parallel to the scan direction; Y (cm) is a variable location with axis running normal to the scan direction; t (sec) is the time at which an individual beam pulse begins in the image plane relative to an arbitrary time t=0; w (sec) is the time width of each pulse, P is the irradiance (mW) in the exposing beam of each pulse at the image plane; and "a" is the acceleration (cm/sec$^{\wedge}$2) of the beam spot in the image plane.

21. An apparatus as defined in claim 20, wherein the scan lines have a beginning and an end, and wherein the duration of the beam pulses within a distance equal to two times the 1/e$^{\wedge}$2 spot radius at the beginning and at the end of the scan lines is greater than that of the rest of the pulses.

22. An apparatus as defined in claim 20, wherein any perimeter of a layer is scanned in addition to a parallel line scan of the layer.

23. An apparatus as defined in claim 20, wherein the scan liens within a distance equal to two times the 1e 2 spot radius from any perimeter of a layer have beam pulses of duration greater than that of the rest of the pulses.

24. An apparatus as defined in claim 14, wherein the beam comprises ultraviolet radiation.

25. An apparatus as defined in claim 14, wherein the intensity of the radiation beam is modulated in an analog mode.

26. An apparatus as defined in claim 14, wherein the beam comprises visible radiation.

27. An apparatus as defined in claim 14, wherein the beam comprises infrared radiation.

28. An apparatus as defined in claim 15 wherein the beam irradiance is controlled in an analog manner by modulation means to provide greater exposure than that of the rest of a layer within two times the 1/e 2 spot radius of any perimeter of a layer formed in the image plane.

* * * * *

UNITED STATES PATENT AND TRADEMARK OFFICE
CERTIFICATE OF CORRECTION

PATENT NO. : 5,014,207

DATED : May 7, 1991

INVENTOR(S) : Lawton

It is certified that error appears in the above-identified patent and that said Letters Patent is hereby corrected as shown below:

Column 4, line 3: change "intensity" to -- power --.

Column 5, line 5: before "is" delete --it--.

Column 5, line 14: change "Center Point" to --Centre Pointe--.

Column 6, line 61: after "parallel" insert --to--.

Column 8, line 15: delete "$G\{E\} = G\{P \exp[-2((Y/r_0)^2)]/(\sqrt{2\pi}\ v\ r_0)\}$" and substitute therefor --$G\{E\} = G\{\sqrt{2}P \exp[-2((Y/r_0)^2)]/(\sqrt{\pi}\ v\ r_0)\}$--.

Column 8, line 23: delete "11/^2" and substitute therefor --1/e^2--.

Column 9, line 6: delete "$\sum_{Y_k=0}^{Y_k} G\{P \exp[-2((Y-Y_k/r_0)^2)]/(\sqrt{2\pi}\ v\ r_0)\}$"

UNITED STATES PATENT AND TRADEMARK OFFICE
CERTIFICATE OF CORRECTION

PATENT NO. : 5,014,207

DATED : May 7, 1991

INVENTOR(S) : Lawton

It is certified that error appears in the above-identified patent and that said Letters Patent is hereby corrected as shown below:

and substitute therefor $-- \sum_{Y_k=0}^{Y_k} G\{\sqrt{2}P \exp[-2(((Y-Y_k)/r_0)^\wedge 2)]/(\sqrt{\pi}\ v\ r_0)\} --$.

Column 9, line 24: delete "$G\{\sum_{Y_k=0}^{Y_k} P \exp[-2((Y-Y_k/r_0)^\wedge 2)]/(\sqrt{2\pi}\ v\ r_0)\}$"

and substitute therefor $--G\{\sum_{Y_k=0}^{Y_k} \sqrt{2}P \exp[-2(((Y-Y_k)/r_0)^\wedge 2)]/(\sqrt{\pi}\ v\ r_0)\}--$.

Column 10, line 3: after "equal" insert --to--.

Column 10, line 33: change "to" to --of--.

Column 12, line 44: before "specified" insert --a--.

Column 12, line 63: after "equation [4]" delete "an-".

Column 12, line 64: before "and solving" delete --dequation [4]--.

Column 12, last line and Column 13, first line: delete

UNITED STATES PATENT AND TRADEMARK OFFICE
CERTIFICATE OF CORRECTION

PATENT NO. : 5,014,207

DATED : May 7, 1991

INVENTOR(S) : Lawton

It is certified that error appears in the above-identified patent and that said Letters Patent is hereby corrected as shown below:

$$\text{"Vxmax} = \text{Exp}\left[\left(\frac{1}{2}C\right)\left((B+2C\,\ln[P/\sqrt{2\pi}r_o] - \sqrt{(B + 2C\,\ln[P/\sqrt{2\pi}\,r_o])^2 - 4C(A - D + B\,\ln[P/\sqrt{2\pi}\,r_o] + C(\ln[P/\sqrt{2\pi}\,r_o])^2)}\right)\right]$$

and substitute therefor $$--\text{Vxmax} = \exp\left[\frac{B}{2C} - \frac{1}{2}\sqrt{\left(\frac{B^2}{C^2}\right) - \frac{4(A-D)}{C}} + \ln\left[\frac{\sqrt{2}\,P}{\sqrt{\pi}\,r_0}\right]\right]--$$

Column 13, line 23: change "an intensity" to --a power--.

Column 13, line 24: change "it" to --if--.

Column 13, lines 59: change "represent" to --represents--.

Column 14, line 27: delete " $1/(\pi\,r_0{}^2)\sum_{Y=0}^{Y_k}\sum_{X=0}^{X_p}\text{Exp}[-2(Y-$ " and substitute therefor -- $2/(\pi\,r_0{}^2)\sum_{Y=0}^{Y_k}\sum_{X=0}^{X_p}\exp[-2((Y-$ --.

UNITED STATES PATENT AND TRADEMARK OFFICE
CERTIFICATE OF CORRECTION

PATENT NO. : 5,014,207
DATED : May 7, 1991
INVENTOR(S) : Lawton

It is certified that error appears in the above-identified patent and that said Letters Patent is hereby corrected as shown below:

Column 17, line 46: delete "$G \left\{ \sum_{Y_k=0}^{Y_k} P \exp[-2((Y-Y_k/r_0)^2)]/(\sqrt{2\pi} \; v \; r_0) \right\}$"

and substitute therefor --$G \left\{ \sum_{Y_k=0}^{Y_k} \sqrt{2} P \exp[-2(((Y-Y_k)/r_0)^2)]/(\sqrt{\pi} \; v \; r_0) \right\}$--.

Column 18, line 10: change "form" to --from--.

Column 18, line 20: change "on time" to --one times--.

Column 18, line 38: delete

"$G \left\{ 1/(\pi \; r_0{}^2) \sum_{Y_k=0}^{Y_k} \sum_{X_p=0}^{X_p} \mathrm{Exp}[-2(Y-Y_k)/r_0)^2] * \right.$"

and substitute therefor

--$G \left\{ 2/(\pi \; r_0{}^2) \sum_{Y_k=0}^{Y_k} \sum_{X_p=0}^{X_p} \exp[-2(((Y-Y_k)/r_0)^2] * \right.$ --.

UNITED STATES PATENT AND TRADEMARK OFFICE
CERTIFICATE OF CORRECTION

PATENT NO. : 5,014,207

DATED : May 7, 1991

INVENTOR(S) : Lawton

Page 5 of 7

It is certified that error appears in the above-identified patent and that said Letters Patent is hereby corrected as shown below:

Column 18, line 62: change "maximum irradiance" to --power--.

Column 22, line 60: change "radiation" to --said first computer control--.

Column 23, line 3: change "with," to --with--.

Column 23, line 4: change "means," to --means--.

Column 23, line 26: change "ad" to --as--.

Column 23, line 33: delete "$G\left\{\sum_{Y_k=0}^{Y_k} P \exp[-2((Y-Y_k/r_0)^2)]/(\sqrt{2\pi}\ v\ r_0)\right\}$"

and substitute therefor --$G\left\{\sum_{Y_k=0}^{Y_k} \sqrt{2}P \exp[-2(((Y-Y_k)/r_0)^2)]/(\sqrt{\pi}\ v\ r_0)\right\}$--.

Column 23, line 41: change "irradiance" to --power--.

Column 23, line 46: change "ad" to --as--.

Column 24, line 12: delete

UNITED STATES PATENT AND TRADEMARK OFFICE
CERTIFICATE OF CORRECTION

PATENT NO. : 5,014,207

DATED : May 7, 1991

INVENTOR(S) : Lawton

It is certified that error appears in the above-identified patent and that said Letters Patent is hereby corrected as shown below:

$$" G \left\{ 1/(\pi \; r_0{}^2) \sum_{Y_k=0}^{Y_k} \sum_{X_p=0}^{X_p} \mathrm{Exp}[-2(Y-Y_k)/r_0)^2] * \;"$$

and substitute therefor $$-- G \left\{ 2/(\pi \; r_0{}^2) \sum_{Y_k=0}^{Y_k} \sum_{X_p=0}^{X_p} \exp[-2(((Y-Y_k)/r_0)^2)] * \; --.$$

Column 24, line 32: change "irradiance" to --power--.

Column 25, line 31: delete $"G\left\{\sum_{Y_k=0}^{Y_k} P \exp[-2((Y-Y_k/r_0)^2)]/(\sqrt{2\pi} \; v \; r_0)\right\}"$ and substitute therefor $--G\left\{\sum_{Y_k=0}^{Y_k} \sqrt{2}P \exp[-2(((Y-Y_k)/r_0)^2)]/(\sqrt{\pi} \; v \; r_0)\right\}--.$ Column 25, line 39: change "irradiance" to --power--.

Column 26, line 12: delete

UNITED STATES PATENT AND TRADEMARK OFFICE
CERTIFICATE OF CORRECTION

PATENT NO. : 5,014,207
DATED : May 7, 1991
INVENTOR(S) : Lawton

It is certified that error appears in the above-identified patent and that said Letters Patent is hereby corrected as shown below:

$$" G \left\{ 1/(\pi\ r_0{}^2) \sum_{Y_k=0}^{Y_k} \sum_{X_p=0}^{X_p} \mathrm{Exp}[-2(Y-Y_k)/r_0)^2] * "$$

and substitute therefor $$-- G \left\{ 2/(\pi\ r_0{}^2) \sum_{Y_k=0}^{Y_k} \sum_{X_p=0}^{X_p} \mathrm{exp}[-2(((Y-Y_k)/r_0)^2)] * --.$$

Column 26, line 33: change "irradiance" to --power--.

Column 26, line 47: delete "scan liens within a distance equal to two times the 1e 2" and substitute therefor --scan lines within a distance equal to two times the 1/e^2--.
Column 26, line 63: delete "1/e 2" and substitute therefor --1/e^2--.

Signed and Sealed this

Eleventh Day of October, 1994

Attest:

BRUCE LEHMAN

*Attesting Officer*   *Commissioner of Patents and Trademarks*